(12) United States Patent
Fergason

(10) Patent No.: US 6,917,355 B1
(45) Date of Patent: Jul. 12, 2005

(54) DISPLAY DEVICE FOR PROJECTOR AND METHOD OF MAKING AND USING A DISPLAY DEVICE

(75) Inventor: James L. Fergason, Atherton, CA (US)

(73) Assignee: Lambent LLC, Pepper Pike, OH (US)

( * ) Notice: Subject to any disclaimer, the term of this patent is extended or adjusted under 35 U.S.C. 154(b) by 0 days.

(21) Appl. No.: 09/367,423

(22) PCT Filed: Dec. 17, 1998

(86) PCT No.: PCT/US98/26766

§ 371 (c)(1),
(2), (4) Date: Aug. 12, 1999

(87) PCT Pub. No.: WO99/32921

PCT Pub. Date: Jul. 1, 1999

Related U.S. Application Data

(60) Provisional application No. 60/068,265, filed on Dec. 19, 1997.

(51) Int. Cl.[7] .................................................. G09G 3/34
(52) U.S. Cl. .............................. 345/107; 345/87; 349/5; 349/86; 349/156
(58) Field of Search ........................... 345/32, 84, 107, 345/87, 90, 92, 98; 349/151, 155, 156, 149, 82, 62, 86, 5, 10, 139, 152, 181; 359/56, 259, 296, 302

(56) References Cited

U.S. PATENT DOCUMENTS

| | | | | |
|---|---|---|---|---|
| 4,435,047 A | * | 3/1984 | Fergason ..................... 349/86 |
| 4,606,611 A | * | 8/1986 | Fergason ..................... 349/90 |
| 4,613,207 A | | 9/1986 | Fergason ..................... 350/331 |
| 4,688,900 A | * | 8/1987 | Doane et al. ................. 349/87 |
| 4,728,547 A | * | 3/1988 | Vaz et al. ..................... 428/1 |
| 5,260,815 A | | 11/1993 | Takizawa ..................... 359/41 |
| 5,519,524 A | * | 5/1996 | Fergason et al. ............ 349/149 |
| 5,532,854 A | * | 7/1996 | Fergason ..................... 349/200 |
| 5,566,008 A | * | 10/1996 | Yoshida et al. ............... 349/86 |
| 5,631,750 A | | 5/1997 | Minoura et al. ............. 349/110 |
| 5,729,312 A | * | 3/1998 | Yamagishi et al. .......... 349/86 |
| 5,766,694 A | * | 6/1998 | West et al. .................. 427/510 |
| 5,798,805 A | * | 8/1998 | Ooi et al. ..................... 349/10 |
| 5,835,174 A | * | 11/1998 | Clikeman et al. ............. 349/86 |
| 5,959,710 A | * | 9/1999 | Yaniv ......................... 349/155 |
| 6,151,086 A | * | 11/2000 | Fergason ....................... 349/5 |
| 6,184,954 B1 | * | 2/2001 | Inoue et al. .................. 349/86 |
| 6,232,947 B1 | * | 5/2001 | Miyawaki et al. ............ 345/99 |
| 6,243,152 B1 | * | 6/2001 | Knox et al. .................. 349/86 |
| 6,246,456 B1 | * | 6/2001 | Inoue et al. .................. 349/86 |
| 2001/0005246 A1 | * | 6/2001 | Takiguchi et al. .......... 349/117 |

* cited by examiner

*Primary Examiner*—Henry N. Tran
(74) *Attorney, Agent, or Firm*—Renner, Otto, Boisselle & Sklar, LLP

(57) ABSTRACT

A liquid crystal display includes plural liquid crystal picture elements selectively operable to affect light by scattering or absorbing light or by reducing such scattering or absorption of light, a separator integral with and between respective picture elements, the separator being substantially non-selectively operable to affect light and including spacers between respective picture elements forming a grid of spacers and picture elements and overlying parts of respective driving TFT transistors or the like so they do not detrimentally affect an image or in effect mask out drive elements from being seen in the displayed image or projected image. The liquid crystal may have a birefringence in the range of about 0.12 or less and may be used in a projection system in which an image is formed from non-specular light.

26 Claims, 12 Drawing Sheets

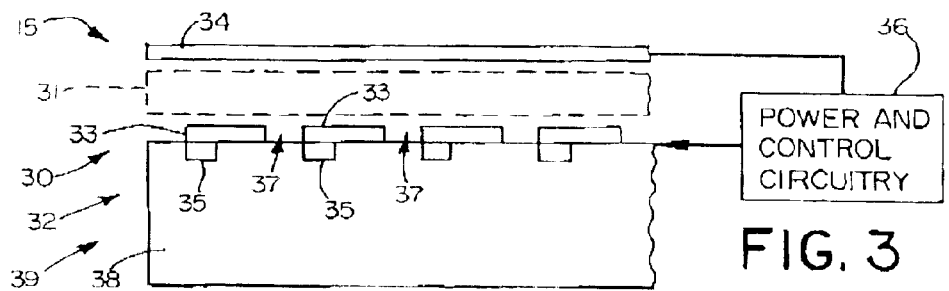
FIG. 3
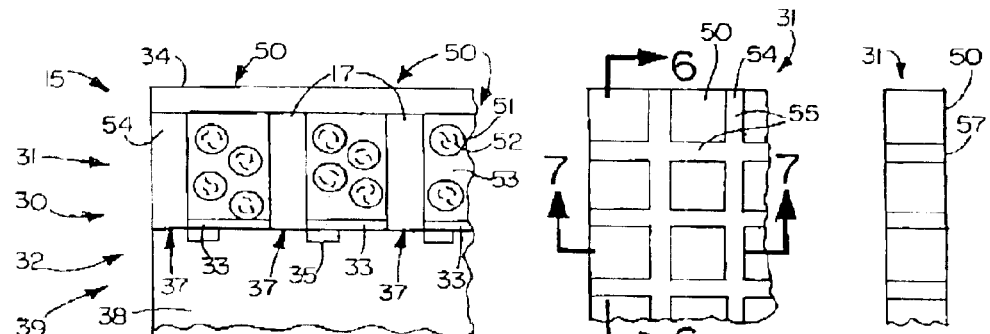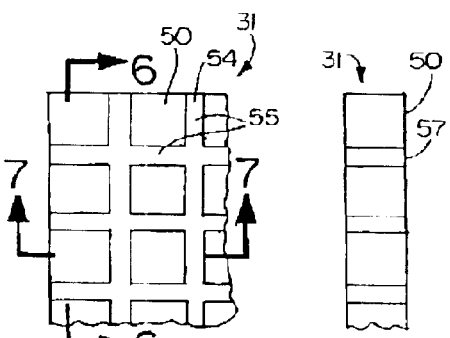
FIG. 4  FIG. 5  FIG. 6
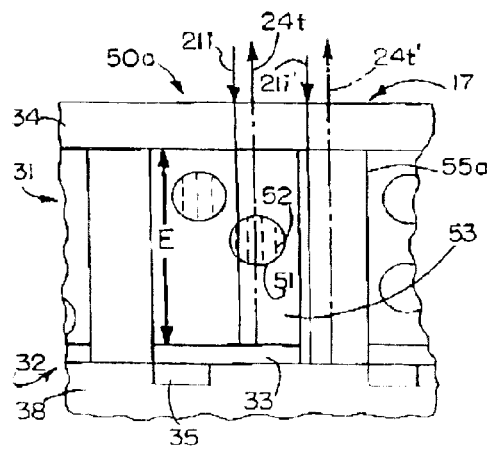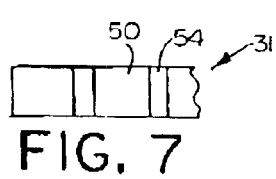
FIG. 7
FIG. 8
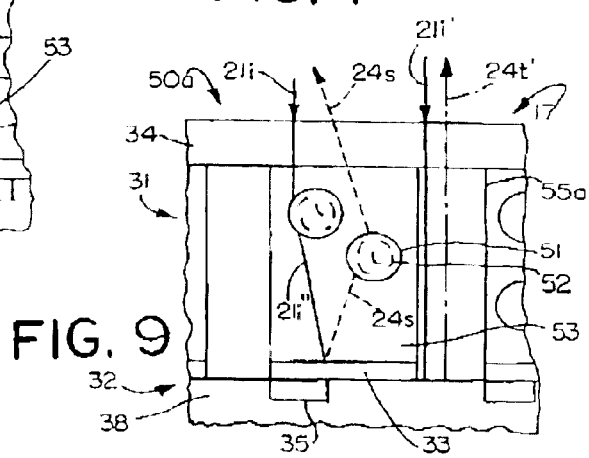
FIG. 9

DISPLAY DEVICE FOR PROJECTOR AND METHOD OF MAKING AND USING A DISPLAY DEVICE

CROSS REFERENCE TO THE RELATED PATENT APPLICATIONS

This application is a national stage of PCT/US98/26766, filed Dec. 17, 1998, which claims priority from application Ser. No. 60/068,265, filed Dec. 19, 1997; the priority of both are claimed.

Reference is made to applicant's commonly owned U.S. patent application Ser. No. 60/040,764, filed Mar. 14, 1997, the entire disclosure of which hereby is incorporated by reference, and the priority of which is claimed.

TECHNICAL FIELD

This invention relates, generally, as is indicated, to a display device or element for projectors or other optical devices or systems, and, more particularly, to a display device or element having a mask or separator between respective picture elements and to methods of making and using the display device or element. This invention also relates to projectors using such display devices.

BACKGROUND

Projectors are used for business, education, diagnostics, entertainment and other purposes to project images from an image source onto a screen or the like for viewing. Many different types of projectors are known, some examples being slide projectors, movie projectors, overhead projectors, and so forth. In some projectors an image which is fixed on a film, slide, or the like, is projected onto a viewing screen. In another type of projector an image is developed or formed in a medium, such as a liquid crystal device, and the image is projected onto a viewing screen; sometimes these are referred to as liquid crystal projectors.

One example of liquid crystal projector uses a twisted nematic liquid crystal cell to modulate light from a light source to produce an image for projection. In such a projector polarized light is selectively transmitted or blocked by the cooperative relation between a twisted nematic liquid crystal cell and an optical polarizer.

Another example of liquid crystal projector uses the principle of selective scattering or transmitting of light by a liquid crystal device in cooperation with an optical aperture and stop to discriminate between transmitted and scattered light to provide an image for projection. A liquid crystal device sometimes referred to as NCAP, PDLC, LCPC and possibly by other names is useful to provide the selective light scattering or transmitting in such a projector. One example of such a projector is disclosed in U.S. Pat. No. 4,613,207. Several examples of liquid crystal materials or devices useful in such a projector are disclosed in U.S. Pat. Nos. 4,435,047, 4,606,611, 4,688,900, and 4,728,547. For brevity, such materials and devices which are operable to scatter light or to transmit light collectively may be referred to below as NCAP materials or NCAP devices, and liquid crystal projectors using NCAP materials collectively may be referred to below as an NCAP based LCD projector ("LCD" being a conventional shorthand for liquid crystal display or liquid crystal device) or more simply as NCAP projector.

NCAP projectors which use the switchable light scattering properties of NCAP materials to modulate light have been demonstrated for example, as is disclosed in U.S. Pat. No. 4,613,207. In one embodiment of a projector disclosed in the '207 patent the light source is focused onto a small aperture located in a plate or mask between the projection lens and an NCAP device which is operable as a display to form an image. If the NCAP device (or a picture element, pixel or other part thereof) is in a clear (non-scattering light transmitting) state, substantially all of the light from the NCAP device (or from the indicated pixel) passes through the aperture and is collected and projected by the projection lens. Such transmitted light sometimes is referred to as specular light or specularly transmitted light. Light scattered by the NCAP device or from one or more pixels thereof (sometimes referred to as scattered light) is redirected away from the aperture and is blocked or stopped by the plate in which the aperture is located. In such a projector some of the scattered light may also impinge on and pass through the aperture; this light leakage can reduce contrast of the output. It would be desirable to improve contrast, for example, to increase the contrast or contrast ratio between bright and dark areas of a projected image.

Another embodiment of NCAP projector disclosed in the above '207 patent uses Schlieren optics. A projector which uses Schlieren optics may be referred to as a Schlieren projector, Schlieren optics projector or dark field projector. The Schlieren optics discriminate between light that is transmitted and light that is scattered by a display; the Schlieren projector projects scattered light and blocks transmitted light. An advantage of a Schlieren projector is an improved dark field, which can lead to higher contrast. One reason for such contrast improvement is improved discrimination between the light which is scattered by the NCAP device and the light which is transmitted by that device (specular light); the scattered light is collected and used in the output image, but the transmitted light (specular light) is blocked by a mask or stop in the light path and, therefore, does not reduce contrast.

Various display devices have been used as a "light engine" to create an image for projection, for example using various of the above-mentioned projectors. For example, in U.S. Pat. No. 5,519,524 is disclosed a miniature image source in which electrical input is provided by an electrical drive which includes respective electrodes and transistors associated therewith in an active matrix type liquid crystal display. The electrodes and transistors of the active matrix display are formed in/on a semiconductor substrate, sometimes referred to as an active matrix or a TFT (thin film transistor) device or as an active matrix substrate; one or more counter electrodes are opposite the respective active matrix electrodes. Respective picture elements are formed by the counter electrode and respective electrodes and the liquid crystal material therebetween. Alignment of liquid crystal material between respective active matrix electrodes and counter electrode(s) can be affected by providing electric field between the electrodes; and characteristics of polarized light, e.g., the direction of polarization, transmitted through the miniature image source can be changed or not depending on whether or not a field is applied and the magnitude of the field. Another example of an active matrix (or TFT) type of display device is disclosed in U.S. Pat. No. 5,532,854.

Advantages of size, power, manufacturing, resolution, and so forth, inure to active matrix (TFT) type display systems. Such systems are referred to as electronic input type display systems. Another type of electronic input type display system is referred to as MIM. Others also may exist, may be developed in the future and may be useful in the invention.

In electronic input type display systems it is necessary to provide space between respective active matrix transistors and electrodes directly associated therewith, thus, providing space between respective relatively adjacent picture elements. Such space provides electrical insulation or isolation and is an area in which conductors or conductive paths may be located to connect to respective transistors or other parts of the device. Such space usually is not active to present changeable image characteristics of the optical output of an active matrix display device and may be referred to as optically dead space.

In a reflective electronic type display system there usually is some type of reflector or reflective surface or material to reflect light. For example, electrodes may be reflective or include a reflective coating or treatment and/or a separate reflector may be provided, as is known. Sometimes light which is incident on the optical dead space also is reflected. Thus, light incident on such reflector is reflected back in the opposite direction; if the incident light impinges on the reflective surface at an angle other than normal, the angle of incidence will be the same or substantially the same as the angle of reflection as is the case for conventional reflectors and if the incident light is incident normal to the reflector. Where the light is transmitted through liquid crystal material the light may or may not have changed polarization characteristics, depending on the current alignment of the liquid crystal material; but where the light is incident on optically dead space and reflects back from that space, the polarization characteristics of the light usually would not be altered as a function of electrical input, as there is no electrode there to apply electric field. Therefore, the existence of the optically dead space may have a detrimental affect on the resolution and/or contrast of the optical output.

A scattering type liquid crystal system may include a liquid crystal display, such as NCAP material or an NCAP display, and a drive device, such as an electronic drive, for example, an active matrix, thin film transistor (TFT), metal insulator metal (MIM) or some other drive device for the display. In a reflective type of NCAP display system, optically reflective portions reflect light passed through the display device back through the display device for output as scattered or as unscattered (transmitted) light. It has been discovered that due to scattering caused by portions of the liquid crystal display device which are aligned with the optically dead spaces or with certain components or elements in the optically dead spaces of the drive unwanted scattered light may be projected by a Schlieren optics projector. Such scattered light may bypass the stop so as to be projected, which reduces the contrast or contrast ratio of the projected image. Accordingly, it would be desirable to eliminate from projection scattered light which does not derive from intended picture elements or areas of the display.

SUMMARY

Briefly, according to an aspect of this invention, a separator or mask is provided between picture elements and/or in the area of optically dead space of the display or image forming device used in a Schlieren optics projector system.

According to another aspect, the projecting of light from optically dead space in a Schlieren optics projector is reduced or eliminated by reducing or preventing light scattering in the area of the optically dead space.

According to another aspect of the invention, a liquid crystal display device that is selectively operable to scatter incident light or to reduce the amount of scattering has plural picture elements, pixels or areas (hereinafter referred to as "picture elements" for convenience) to which electrical input, such as an electric field or other electrical input, magnetic input, etc., can be applied to cause a desired physical and/or optical effect. A mask, divider or separator (hereinafter usually referred to as "separator" for convenience) is between respective picture elements. The separator does not ordinarily change its optical characteristics when the optical characteristics of the liquid crystal device changes its characteristics, and therefore it is possible to filter out or to discriminate out light therefrom, as is described in greater detail below. Light that is delivered as an output by the liquid crystal device may include light that is scattered and/or light that is not scattered. A Schlieren optics system associated with a projector discriminates between the scattered light and non-scattered light (sometimes referred to as "unscattered" transmitted or "specular" light) and delivers the appropriate light for projection. In an embodiment the scattered light, e.g., the light which is scattered at least outside, beyond or at greater than a predetermined angle or that is in any event passed by the Schlieren optics system, is projected. The separator is selected as not to scatter light. Therefore, light from the separator which is delivered to the Schlieren optics system is blocked from projection. The projected light, then, is substantially exclusively the scattered light and contrast ratio of the projected image is enhanced.

According to another aspect of the present invention, a separator, divider or mask (hereinafter referred to by any of these terms) is between respective picture elements or areas of a liquid crystal display. The separator is aligned with the dead space of the electrical drive of the display system used in a Schlieren optics projector. The separator preferably does not ordinarily change optical characteristics as the inputs to the picture elements of the liquid crystal display are changed. In an embodiment the separator is does not scatter light or is at least substantially non-scattering whereas portions of the display can be scattering or non-scattering to create an image for projection. Light which is not scattered can be discriminated by Schlieren optics and blocked from projection, whereas scattered light can be projected to create a projected image on a screen.

According to another aspect a liquid crystal material is at least partly dissolved in a medium. The combination of liquid crystal material and medium is applied to an electrical drive, such as an active matrix substrate. The liquid crystal and medium is cured, dried, cross-linked, etc., in a controlled manner to form therein both areas of picture elements 53 which are operable selectively to scatter light or to reduce scattering and separators, which do not change optical characteristics, between respective picture elements.

In an embodiment of the invention, the separator is of the same material as the medium of the liquid crystal display device, e.g., the medium in which the liquid crystal material is contained or with which the liquid crystal material is cooperative to provide optical output. However, preferably the medium forming the separator does not include liquid crystal material; or, alternatively, the separator does not include liquid crystal material that in use of the liquid crystal display system would change alignment and/or affect on light.

In an embodiment an exemplary electrical drive device for the liquid crystal device is a solid state device, such as an active matrix device, thin film transistor (TFT) device, metal insulator metal (MIM) device, or other device which has sections for applying input to a nearby picture element of the liquid crystal display device, e.g., a picture element aligned with respect to a respective section. Such sections may be, for example, electrodes and associated transistors and/or other devices for applying the prescribed input to the liquid crystal device. Between such sections there usually is optically dead space for electrical leads, for electrical insulating purposes, for other components of the drive, etc. The separator may be aligned with such space, and, since the Schlieren optics is able to block the projecting of light from the area of such divider or separator, the effect of the space and/or of the separator, such as reflected light from a reflector or components in the space and transmitted by the separator, is not projected and does not have an impact on the projected image.

In the above copending U.S. patent application are described improvements to a liquid crystal projector which uses an optics arrangement, sometimes referred to as Schlieren optics, in which scattered light is projected and transmitted light (specular light) is blocked.

Briefly, as is described in such copending patent application, an NCAP projector may use optics in which scattered light is projected and specular light is blocked; and a liquid crystal device for selectively transmitting or scattering light through a relatively controlled angle. The control of the scattering angle may be by using relatively low birefringence liquid crystal material in an NCAP device and/or by relatively accurately controlling the size of volumes of liquid crystal in the liquid crystal device. A number of advantages may inure to such a projector, such as, for example, an improved dark field, which leads to higher contrast, good light collection efficiency, tolerance of high intensity light sources, which leads to high brightness, and the ability to use very thin NCAP devices, which may reduce voltage drive requirements relative to a thicker device.

One or more of the following aspects or features may be included in the invention of the mentioned copending application and in the invention of the present application:

(A) The simple center hole aperture of prior projectors which project light transmitted by the liquid crystal device is replaced by a ring aperture with a stop in the center. The stop in the center of the ring aperture may be the same size as the original simple hole aperture (or may be some other size). The specular light is blocked by the stop and the scattered light passes through the ring to be captured by the projection lens. The contrast in this type of projector may be increased relative to projectors with center hole apertures by minimizing the brightness of the dark state.

(B) Brightness of the dark state may be reduced or minimized by reducing or minimizing the residual haze of the full on state (transmissive mode) of the NCAP device. This can usually be done by collimating the light incident on the liquid crystal device so that the light would have normal incidence and, therefore, be well collimated as it passes through the NCAP device.

(C) A projection system includes a source of collimated (parallel) light, a liquid crystal device for selectively transmitting light or scattering light through a relatively controlled angle, and an aperture arrangement for transmitting scattered light while blocking specularly transmitted light.

(D) A projector includes a source of collimated light, a liquid crystal means for selectively transmitting light or scattering light through a relatively controlled angle, the liquid crystal means includes relatively low birefringence liquid crystal in a containment medium, and the liquid crystal having an ordinary index of refraction substantially matched to the index of refraction of the containment medium, focusing means for focusing the collimated light substantially to a point, a stop for blocking light directed to that point, and an opening for transmitting scattered light to form an image beyond that point.

(E) A method of controlling the angle of scattering of output light in a liquid crystal device includes controlling, limiting or selecting the birefringence of the liquid crystal material which cooperates with another medium and selectively scatters light or transmits light, the controlling, limiting or selecting comprising placing in physical relation with the medium, liquid crystal material that has a birefringence of about 0.12 or less.

(F) A projection system in which an image is formed from nonspecular light includes a collimated light input, a liquid crystal device including liquid crystal material for selectively specularly transmitting light or non-specularly scattering light, projection optics for receiving non-specularly scattered light for projection, means to block the specularly transmitted light from projection by the projection optics, and wherein the angle of non-specular scattering is controlled by limiting the liquid crystal material to a birefringence that is about 0.12 or less.

(G) A projection system in which an image is formed from nonspecular light includes a collimated light input, a liquid crystal device including low birefringence liquid crystal material in volumes in a containment medium for selectively specularly transmitting light or non-specularly scattering light, projection optics for receiving non-specularly scattered light for projection, means to block the specularly transmitted light from projection by the projection optics, and wherein the angle of non-specular scattering is controlled by limiting the size of the volumes to about 5 microns or less.

(H) A projection method includes selectively scattering light over a relatively controlled angle or specularly transmitting light, blocking the specularly transmitted light, and directing the scattered light to provide an output image.

(I) A method of getting collimated light into a liquid crystal device that is operable selectively to scatter light or to transmit light without substantial scattering includes directing light from a light source to a beam splitter, reflecting light from the beam splitter to a collimating lens, directing the collimated light into the incident side of a liquid crystal device.

(J) A method of projecting a relatively high contrast image includes directing collimated light through a liquid crystal device that provides selectively transmitting of light or controlled scattering of light, using Schlieren optical system discriminating between transmitted light and scattered light, and projecting the scattered light to form an optical output.

In accordance with an aspect of the present invention a scattering type liquid crystal display device includes liquid crystal material that is selectively operable by a drive (e.g., electrical, magnetic, or some other drive) to transmit or to scatter light to create an image for projection, a Schlieren optics projector (or other projector which projects scattered light), and a light transmissive mask or separator to reduce unwanted light scattering by the liquid crystal display device at optically dead spaces or areas of the drive. Reflected light from the optically dead spaces may be focused at the mask of the Schlieren optics and blocked thereby so that such light will not be projected. Exemplary projectors or projection systems are mentioned above and are disclosed in several of the above-identified patents and patent applications.

The various patents and patent applications mentioned herein are hereby incorporated in their entireties by reference thereto.

The invention, then, comprises the features described herein the description and the annexed drawings set forth in detail certain illustrative embodiments of the invention.

These embodiments are indicative, however, of but a few of the various ways in which the principles of the invention may be employed.

Although the invention is shown and described with respect to certain embodiments, it is evident that equivalents and modifications will occur to others skilled in the art upon the reading and understanding of the specification. The present invention includes all such equivalents and modifications

BRIEF DESCRIPTION OF THE DRAWINGS

In the annexed drawings:

FIG. 3 is a schematic side elevation view of an active matrix liquid crystal display;

FIG. 4 is an enlarged view of a part of the active matrix display of FIG. 3;

FIG. 5 is a plan view of the liquid crystal device used in the display of FIGS. 3 and 4;

FIGS. 6 and 7 are section views of the liquid crystal device looking generally in the direction of arrows 6—6 and 7—7 of FIG. 5, respectively;

FIGS. 8 and 9 are schematic section view illustrations of a picture element of the display of FIGS. 3 and 4 respectively in the light transmitting and light scattering states or modes;

DESCRIPTION

Figure 1:
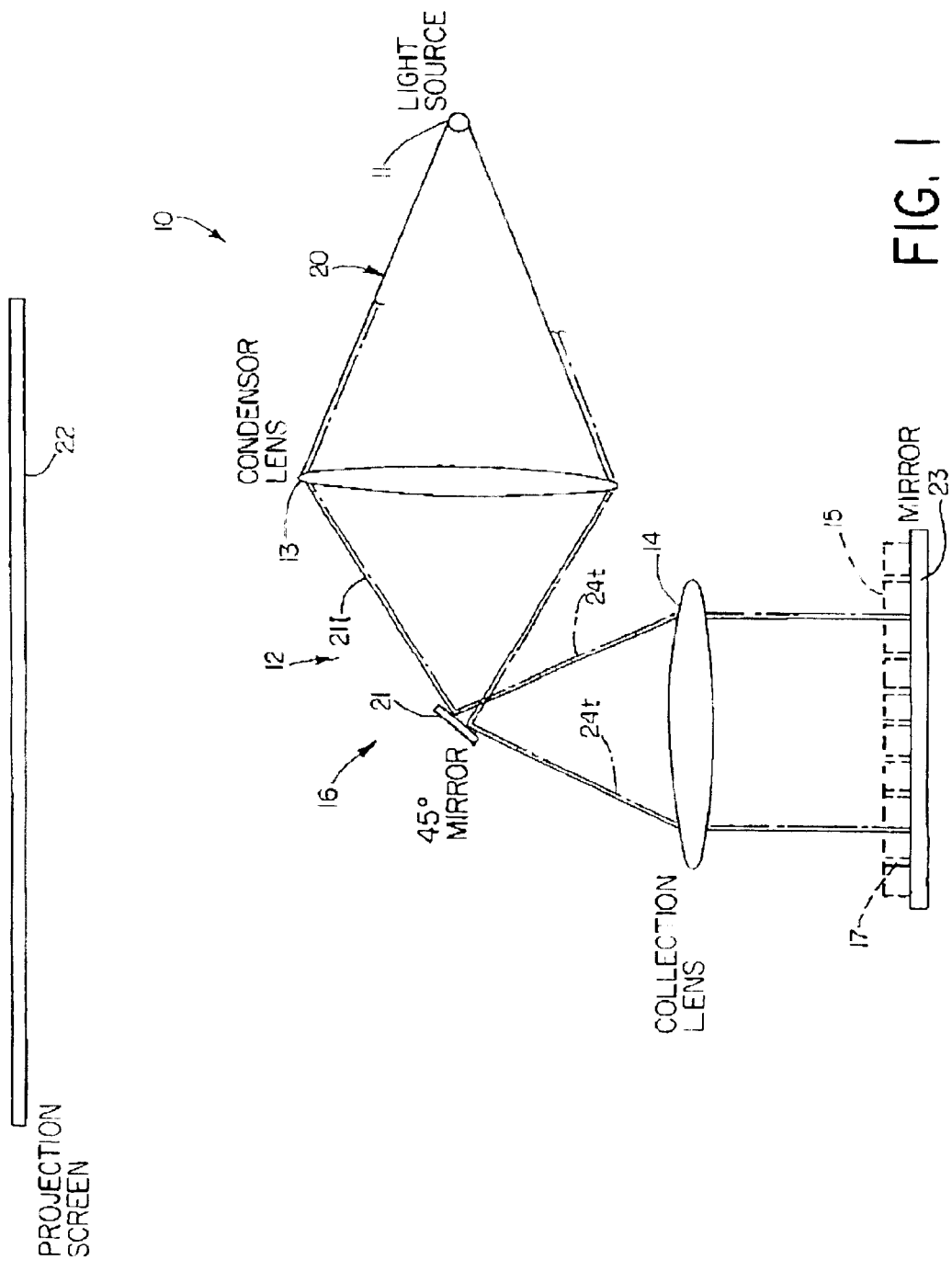
FIG. 1 is a schematic illustration of a Schlieren optics projector sharing the specular light path.

In referring to the drawings, which are schematic, like reference numerals designate like parts in the several figures, and the same primed and unprimed reference numerals usually designate parts which are similar in form or function.

Figure 2:
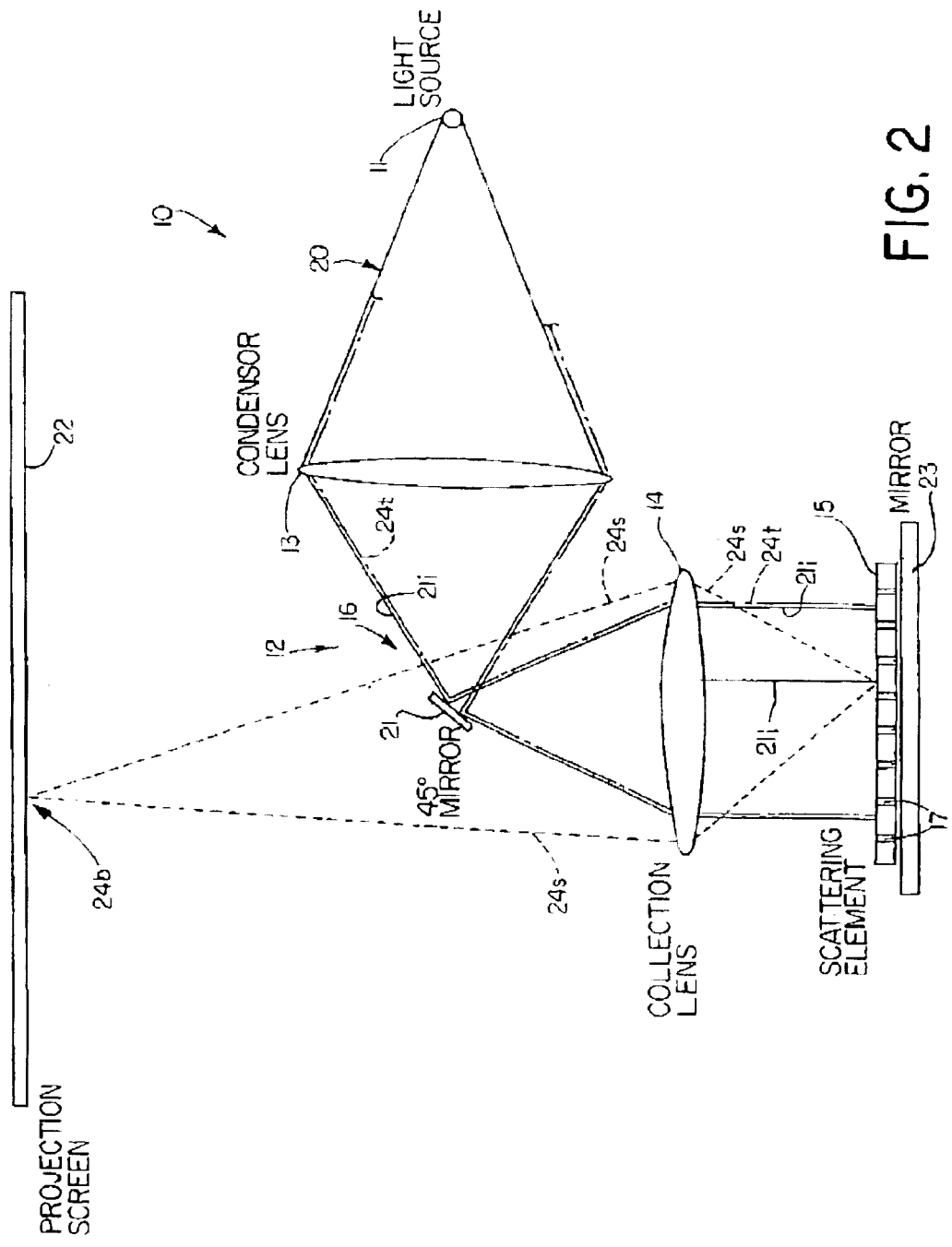
FIG. 2 is a schematic illustration of a Schlieren optics projector sharing both scattered light and specular light paths.

Turning to FIGS. 1 and 2, an exemplary Schlieren optics projector 10 in accordance with an embodiment of the invention includes a light source 11, a lens system 12, including, for example, a condenser lens 13 and a collection and projection lens 14, a reflective scattering device or system 15, and Schlieren optics 16. A separator 17 (sometimes referred to as a mask) which does not scatter light is associated with the scattering device 15. In FIG. 1 the scattering device 15 is shown in dotted outline so the path of light 20 in the projector 10 absent scattering easily can be seen. In FIG. 2 the paths of unscattered light (sometimes referred to as specular light) and of scattered light are shown.

Light 20 from the light source 11 is directed by the condenser lens 13 via a mirror 21 to the collection/projection lens 14 which collimates the incident light 21i and directs the collimated light to the scattering device 15. The scattering device 15 is selectively operable to scatter light or not to scatter light. The scattered light will be passed by Schlieren optics 16 for projection to a projection screen 22, and the light which is not scattered by the scattering device 15 specular light is blocked from projection. The separator does not scatter light, and the specular light therefrom also is blocked from projection.

The scattering device 15 may have some light reflecting characteristics and/or may include a mirror 23 or some other type of reflective means which reflects light that has passed through the scattering device, back through the scattering device for delivery to the Schlieren optics 16. Exemplary light paths for respective portions of the reflected light are, as follows:

i. Phantom lines 24t represent specular light, e.g., light that is not scattered by the device 15; and ii. Dash lines 24s represent scattered light, e.g., light that is scattered by the device 15.

The scattered light 24s is collected by the collection lens 14 and is projected by that lens (and by one or more additional optical elements, such as lenses, mirrors, etc.) toward the screen 22 to form a bright spot 24b corresponding to a picture element or area of the scattering device 15 which is in the scattering mode. A collection of such bright spots 24b forms the relatively bright areas of the projected image at the screen 22. Specular light 24t from picture elements or areas of the scattering device 15, which are in the light transmissive (non-scattering) mode, is collected by the lens 14 and is directed to the mirror 21 of the Schlieren optics 16. These light transmissive mode areas of the scattering device 15 correspond to the relatively dark areas of the projected image at the screen 22.

Referring to FIGS. 3–7, the scattering device 15 is shown schematically. The scattering device 15 is a liquid crystal display system 30 which includes a liquid crystal device 31 and an electrical drive 32. The electrical drive 32 is a TFT active matrix electrical drive system which includes a plurality of controlled electrodes 33 and one or more transparent counter electrodes (sometimes referred to as ground electrodes, etc.) 34. The electrodes 33 are selectively connected to a source of electrical energy by one or more respective transistors 35 which are controlled by and which receive power from power and control circuitry 36. Between respective electrodes 33 is space 37. The spaces 37 provide electrical insulation between electrodes 33 and also provide a place where conductors or conductive paths may be located, as is conventional in active matrix drives. The electrodes 33, transistors 35, electrically conductive paths (such as electrical conductors) and possibly other electrical and/or electronic components are located on and/or in a semi-conductor substrate 38. The substrate 38 and components thereof may be referred to collectively as an active matrix substrate 39 or active matrix drive. Various types of active matrix drives are known and may be used in the invention. Several examples are disclosed in U.S. Pat. Nos. 5,532,854 and 5,519,524. Power and control circuitry 36 provides controlled operation of the respective transistors 35 and the selective delivery of electrical power or energy to and/or appropriate ground connections, for example, for the respective electrodes 33, 34, as may be conventional in an active matrix drive for a liquid crystal display.

The electrodes 33 may be optically reflective or may include a coating of an optically reflective material to reflect light received via the liquid crystal device 31 back into the liquid crystal device. Similarly, light reflecting properties may be included and/or inherent in the space 37, for example, by a light reflecting characteristic of the surface of the semi-conductor substrate 38 in the area of the space 37, light reflecting characteristics of the conductors and/or other devices in the area of the space 37, and/or a separate light reflective coating there. Various means are known in the art to obtain such reflection, as it is known to use active matrix drives for reflective liquid crystal display systems. Thus, various conventional or other means may be employed to provide the light reflecting characteristics for the system 30. Moreover, it is possible that the space and/or the conductors and/or other means in the space 37 are not optically reflective and that light received via the liquid crystal device 31 in the area of the space 37 is not reflective.

The liquid crystal device 31 includes a plurality of picture elements 50, sometimes referred to as pixels or picture areas, etc. Each picture element 50 is formed of one or more volumes 51 of liquid crystal material 52 in a medium 53. The medium 53 is optically transparent and has an index of refraction. The liquid crystal material 52 is nematic liquid crystal or is operationally nematic (meaning liquid crystal that has operational characteristics that are the same or similar to those of nematic liquid crystal, for example). Also, the liquid crystal material preferably is birefringent, has an ordinary index of refraction which is the same as or is substantially the same as (matches or is substantially matched to) the index of refraction of the medium 53 and an extraordinary index of refraction which is different from the index of refraction of the medium 53. Further, the liquid crystal material 51 has positive dielectric anisotropy. Examples of volumes of liquid crystal material 52 in a medium 53, operation and cooperation thereof and the making and using thereof are described, for example, in a number of the above-mentioned patents and patent application including, for example, U.S. Pat. Nos. 4,435,047 (Fergason) and 4,728,547 (Vaz), and U.S. Pat. Application No. 60/040,764.

Summarizing operation of the liquid crystal display system 30, considering one of the picture elements 50, if no electric field is applied between the electrode 33 and the counter electrode 34 associated with such picture element, the liquid crystal material 52 is in a random orientation so as to cause refraction or scattering of light as the light transmits through the picture element. The scattered light is reflected back through the picture element, for example, by the reflective electrode 33 or by some other reflective means, and is further scattered. The scattered light exits the picture element at the transparent electrode 34 and is collected by the collection lens 14 and projected toward the screen 22. However, if a suitable electric field is applied by a respective electrode 33 and counter electrode 34, incident light 21*i* is transmitted through the picture element without scattering or without substantial scattering to the respective reflective electrode 33 (or other reflective means), and is reflected back through the picture element 50 as unscattered (specular) light 24*t* (FIGS. 1 and 2) for delivery via the collection lens 14 to the mirror 21 which serves as a stop for the Schlieren optics 16. By selectively applying or not applying electric field to the liquid crystal in respective picture elements 50, the non-scattering (transmissive) and scattering modes of the respective picture elements can be determined. There are no electrodes 33 in the area of the optically dead space 37, as such space is used for conductors, electrical insulation, and/or other purposes; if liquid crystal volumes were in the area between the optically dead space 37 and the counter electrode 34 such volumes would scatter light which is undesirable because such light does not contribute to the projected image and reduces contrast of the projected image. The separator 17 is between respective picture elements 50 in the area of optically dead space 37 to reduce or to avoid light scattering from the area of optically dead space.

The separator 17 includes a plurality of segments which separate picture elements from respective relatively adjacent picture elements, as is seen most clearly in FIGS. 4–7. The segments of the separator 17 may be in the form of a matrix seen in the top plan view provided in FIG. 5 such that the respective segments 55 thereof are aligned with respective spaces 37. Preferably the separator 17 does not usually change its affect on light transmitted therethrough as the electrodes 33 and 34 cooperate to apply electric field to respective picture elements 50. Moreover, preferably the separator 17 does not scatter light. Therefore, incident light 21*i* (FIGS. 1 and 2) that is received by the separator and may be reflected by some means in the optically dead space 37 returns essentially in the same path as the specular light 24*t*, and the Schlieren optics blocks that specular light from the projection screen as is shown, for example, in FIG. 2.

The relationship of the Schlieren optics 16 and the optics used to direct incident light to the scattering device 15 is illustrated herein such that the incident light 21*i* is collimated and is incident on the scattering device so as to be substantially normal or perpendicular to the surface thereof and to the reflector mechanism, such as mirror 23, reflective characteristics of the electrodes 33, etc. This arrangement facilitates the Schlieren optics such that incident light 21*i* which is not scattered and is reflected as specular light 24*t* conveniently is stopped by the mirror 21 from projection to the screen 22 and rather is directed out of the projection's system. Other arrangements also could be used whereby the incident light is provided at a different angle relative to the scattering device 15 and reflective mechanism 23, for example, and/or the incident light may be provided as other than collimated light, as will be appreciated.

In FIG. 8 is schematically shown a single picture element 50*a* having an electric field E across the volumes of liquid crystal thereof (two of which are illustrated to avoid cluttering the drawing). The electric field is provided by the circuitry 36 (FIG. 3), conductive paths (not shown), transistor 35, electrode 33, and counter electrode 34 associated with the picture element 50*a*. The electric field E is suitable to cause the liquid crystal material 52 in the volumes 51 thereof to align to transmit light without scattering or without substantial scattering. Accordingly, incident light 21*i* is transmitted through the picture element 50*a* and is reflected as specular light 24*t* which travels substantially in the same path as the incident light. As was described above, the specular light 24*t* is collected by the lens 14 and is directed to the mirror 21 for reflection out of the projection system and does not reach the screen 22. As for the incident light 21*i*' which is directed through a segment 55*a* of the separator 17 adjacent or bounding the picture element FIG. 50*a*, such incident light is transmitted through the segment without scattering or at least without substantial scattering. Such light may be absorbed by means in the optically dead space 37, and in such case, such light does not reach the screen 22. Such incident light 21*i*' may be reflected by mirror 23 or some other means, for example, at or near the surface of the semiconductor substrate 38 as specular light 24*t*' along the same path as the incident light 21*i*'. Such specular light 24*t*' is collected by the lens 14 and is directed to the mirror 21 for reflection out of the projection system so as not to reach the screen 22. The operation of the segment 55*a* would be substantially the same for the other segments 55 of the separator 17.

In FIG. 9 is illustrated schematically operation of the pixel 50*a* when the volumes of liquid crystal therein are in a scattering mode. Only two of those volumes 51 are schematically illustrated in FIG. 9 to avoid cluttering the drawing. In this illustration, electric field is not being applied and the volumes of liquid crystal are in a scattering mode. Incident light 21*i* enters the pixel 50*a* and to some extent is scattered by the volumes of liquid crystal. The path of scattered light is exemplified by lines 21*i*' and 24*s*. Light is reflected by the mirror 23, the reflective electrode 33, or by some other means. Scattered light 24*s* exits the picture element 50*a* in a direction that is not parallel to the originally incident light 21*i*. Such scattered light 24*s* is collected by the lens 14 and is projected past the mirror 21 to the screen 22 to form a bright area 24*b* (FIG. 2). The incident light 21*i*' that is directed to the segment 55*a* and the reflected specular light 24*t*' follow the paths that were described above with respect to FIG. 8 and such specular light 24*t*' is collected by the lens 14 and is directed to the mirror 21 for removal from the projection system so that such light does not reach the screen 22.

Exemplary liquid crystal materials, polymer or other medium in which volumes of liquid crystal may be contained, combinations thereof, and methods for making that may be used in the invention are disclosed in the several patents and patent application mentioned herein. Several examples of liquid crystal, polymer medium and methods are described below. Other liquid crystal materials, media and methods may be used to carry out the principles of the invention.

EXAMPLE 1

A polymer PN393, which is an ultraviolet curable polymer, is mixed with liquid crystal material ZLI2244, which is a nematic liquid crystal that is birefringent, has positive dielectric anisotropy, and an ordinary index of refraction which is substantially matched to that of the polymer when the polymer has been cured. The polymer and liquid crystal are weighted out in proportions of 20% polymer to 80% liquid crystal. The mixture is shaken to cause thorough blending. The mixture may be stored in a dark storage area.

Two pieces of clean ITO (Indium Tin Oxide) coated glass plates or sheets are placed in parallel confronting sandwich-like relation, spaced apart by spacers that are five micrometers (microns). The glass plates are rectangular (an exemplary size is about one inch by one inch, but size is not a limitation), and two pairs of opposite edges are sealed by applying Norland 70UV curable adhesive and exposing it to ultraviolet light for fifteen minutes to obtain sufficient curing and, thus, forming a cell. The interior of the cell is open at the unsealed opposite edges. In a dark room the liquid crystal and polymer mixture is placed at one open end of the cell and the cell is filled by capillary action. After filling, the cell is exposed to ultraviolet light for about two to three hours to achieve suitable curing. The two edges from which the cell is filled then are sealed by applying ultraviolet curable adhesive and exposing it to ultraviolet light for about fifteen minutes to achieve sufficient curing.

The liquid crystal cell is operable to scatter light in the absence of an electric field applied between the ITO electrodes of the glass plates; and it is operable to reduce scattering in the presence of a suitable electrical field.

EXAMPLE 2

A liquid crystal cell is constructed and tested as described in Example 1 except that the spacers are three microns.

EXAMPLE 3

A liquid crystal cell is constructed and tested as described in Example 1 except that the spacers are eight microns.

The refractive index of the PN393 polymer is 1.473. The extraordinary index of refraction of ZLI2244 is 1.556, the birefringence is 0.08, and the ordinary index of refraction is 1.476, which is substantially matched to that of the polymer. As was mentioned above other materials may be used. Also, as for the PN393 polymer, that material initially is a monomer before curing using UV light. Curing in this case is a cross-linking. There are other types of curing, several examples of which include cross-linking, reacting, drying, heating, etc. An example of a process for making the liquid crystal device using UV light for curing is described in U.S. Pat. No. 4,728,547 (Vaz).

Figures 10, 11:
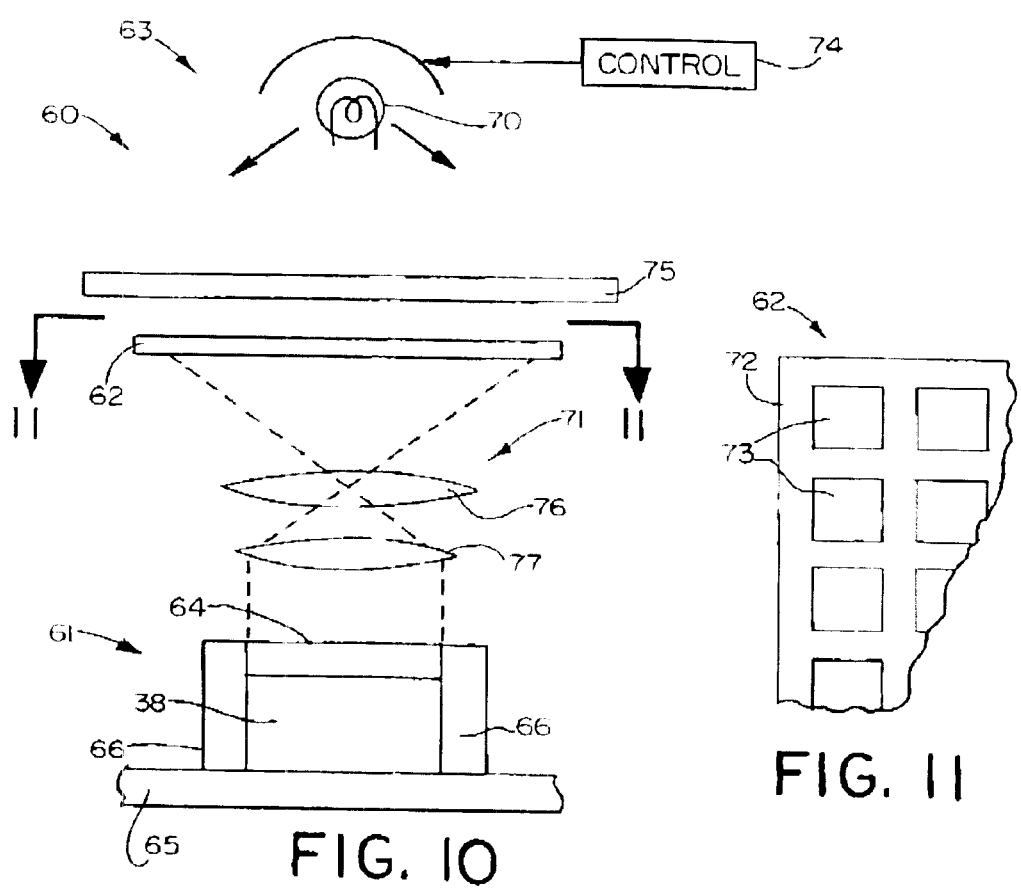
FIG. 10 is a schematic illustration of apparatus to make a liquid crystal device with an integral separator or mask.
FIG. 11 is a plan view of a photographic mask for use in the apparatus of FIG. 10.

Turning to FIGS. 10 and 11, an exemplary apparatus 60 and method for making the liquid crystal device in place on an active matrix semiconductor substrate drive 32 is illustrated schematically at 60. The apparatus 60 includes a holder 61, a mask 62, and an illumination system 63. The holder 61 holds the active matrix substrate 38 and the blend 64 of polymer and liquid crystal, such as that described in the above examples, in position to be exposed to the ultraviolet light applied by the illumination system 63 for curing. The holder 61 may include, for example, a support 65 and several walls 66, which hold the active matrix substrate 38 and blend 64 in position and preferably provide a seal to prevent the blend from leaking down along the sides of the active matrix substrate 39. The height of the walls 66 is sufficient to contain a desired depth of the blend 64. Since the blend may be applied as a liquid or fluidic phase, it may fill the optically dead spaces 37. Therefore, it is possible for the blend to follow the contour of the surface of the active matrix display 38, for example, contacting the respective electrodes 33 and also filling the optically dead space 37. In some prior art active matrix liquid crystal display systems, techniques were used to planarize the surface of the active matrix substrate, for example, to fill in the optically dead space to a level to be coplanar with the electrodes, but such technique may not be needed in the present invention due to the filling of the optically dead space by the blend material 64.

It has been discovered that different portions of the blend 64 can be cured differently to achieve different physical characteristics. For example, the portions of the blend 64 which are to be the separator 17 segments 55 can be cured before the portions which will become the picture elements 50. Initially the portions which form the separator 17 can be cured at a relatively slow rate, for example, using low intensity ultraviolet light. That slow rate allows liquid crystal material that is included in the polymer to be forced out of the polymer as the polymer cures, and such liquid crystal material migrates to the portion of the blend which is not then being cured, namely portions that will be the picture elements 50. The portions of the blend 50 will be the picture elements 50 can be cured subsequently.

The blend 64 is cured using the illumination system 63. The illumination system 63 includes a source of ultraviolet light 70 and one or more lenses 71 to magnify, demagnify and/or collimate the light. Initially light is directed via the mask 60 to the blend 64. The mask 62 includes light transmissive portions 72 and light blocking portions 73. The light transmissive portions 72 are aligned with those areas of the blend 64 which are to form the separator 17. The light blocking portions 73 are aligned with those portions of the blend 64 which are to form the picture elements 50. A control 74 is provided for the ultraviolet light source 70. The control 74 may control the intensity of the ultraviolet light source and/or the time or duration that the light source supplies ultraviolet light. To control intensity, the control may include a diaphragm or aperture mechanism and to control duration, the control may include a timer to time the period in which the light source 70 is energized. A dimmer type control also may be used, such as a control that periodically pulses the light source 70. Various other controls may be used. The mask may be prepared by photographic techniques, such as those used to make masks for selective exposure of emulsions used in the process for fabricating semiconductor devices. The mask may be another device which selectively transmits and blocks transmission of the ultraviolet to respective portions of the blend 64. The function of the control 74 may be supplemented or substituted by the opacity of the transmissive portion of 72 of the mask 62. The size of the mask 62 and of the respective transmissive and non-transmissive portions 72, 73 thereof may be determined by the size of the display device 31, the picture elements 50 and the separator 17 segments 55. Size also may be determined by the nature of the illumination system 63, such as whether the lens system 71 magnifies, demagnifies, collimates, focuses, etc. light incident on and/or transmitted through the mask 62. In the illustrated embodiment the mask 62 is larger than the area of the blend 64 in the holder 61, and the lens system 71 includes a diffuser 75 which diffuses light from the source 70 and delivers the light to the mask 62, a demagnifying lens 76 and a collimating lens 77 by which a collimated light pattern conforming to the mask 62 is directed to the blend 64.

Initially, the system 60 is used to expose portions of the blend 64 which will form the separator 54. Accordingly, ultraviolet light of appropriate intensity is directed via the lens system 71 and through the transmissive portions of the mask 62 to the blend 64. As the polymer in the exposed portions of the blend is cured at a relatively slow rate, the curing process tends to force out of the polymer liquid crystal material, which migrates to the portion of the blend 64 which are not then being cured. Some of the liquid crystal material may remain in the portions of the blend which form the separator 17, but that amount is relatively small and usually is insufficient to form volumes of the liquid crystal that would change optical characteristics when the device 31 is used.

After the separator has been formed by sufficient curing, the mask 62 may be removed, and the entire blend 64 may be exposed to ultraviolet light. This subsequent exposure is preferably at a sufficiently high intensity or rate that volumes of the liquid crystal tend to form in the polymer. An example of such formation is described in the above-mentioned U.S. Pat. No. 4,728,547 (Vaz).

It will be appreciated that other techniques also may be used to make the liquid crystal device 31 so as to have multiple portions including plural picture elements 50 and separator 17. Furthermore, it will be appreciated that a separator 17 with segments 55 that transmit light without scattering or without substantial scattering (or even light absorbing separators) may be used to separate respective picture elements and/or to tend to preclude light from the optically dead space being projected as light output in other types of displays, especially projection displays.

The projector 10 may include additional or different optical elements than those illustrated in FIG. 1 and described above. For example, other types of projection, collimating, condenser, etc. lenses or lens systems may be used; reflectors which have properties of focusing light may be used with or substituted for lenses. Various stops and/or other means may be used in the Schlieren optics portion of the projector to discriminate between light that is scattered by the liquid crystal display and light which is unscattered. Also, it will be appreciated that such discrimination includes determining the angle at which such scattering must occur, e.g., a minimum angle, for such scattered light to bypass the Schlieren optics stop to allow such light to be projected. Also, although the separator 17 of the invention is illustrated and described with respect to a reflective type of liquid crystal display system and associated Schlieren optics, it will be appreciated that the separator principles may be used with transmissive type liquid crystal displays and other optics and projection systems. Furthermore, although the separator is illustrated and described with respect to a liquid crystal type of display system, it will be appreciated that principles of the invention may be used with other types of displays.

The liquid crystal display 30 is selectively operable to scatter light or to reduce scattering (preferably to eliminate scattering or at least substantially to eliminate scattering and, thus, to transmit light without substantial scattering). The volumes 51 of liquid crystal 52 in medium 53 may be separate or discrete; they may be interconnected; they may be respective areas or portions in a relatively large volumetric space, may be that volumetric space, and so forth. In the scattering mode, the display 30 scatters light for projection by the projector 10 (FIG. 1); and in the non-scattering mode, the display transmits light without scattering or with a relatively small amount of scattering so that preferably light at the areas of the display which are in the non-scattering mode will be blocked by the Schlieren optics 16 and will not be projected to the projection screen 22.

In an embodiment the scattering device 15 is a liquid crystal display system. However, it will be appreciated that other devices may be used to provide the functions of selectively scattering or transmitting light and of reflecting and/or otherwise directing the scattered and unscattered light to the Schlieren optics 16 or other discriminator so that the desired light is projected and light that is not desired to be projected will not be projected. Other electrical or electronic drives may be used in addition or alternatively to those described herein.

Figure 12:
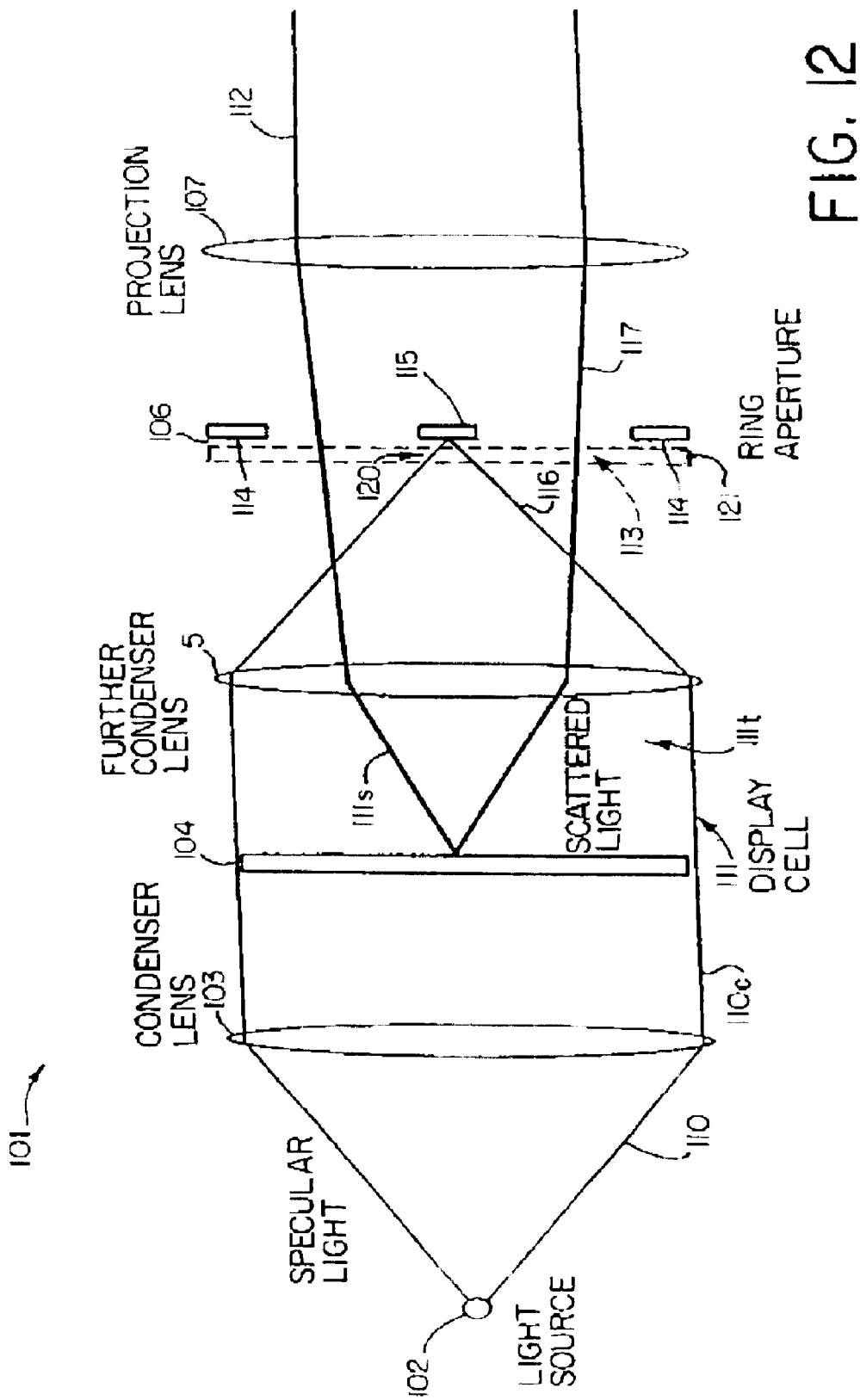
FIG. 12 is a schematic illustration of an embodiment of liquid crystal projector in accordance with the invention.

Referring to FIG. 12, a projector in accordance with an embodiment of the present invention is generally indicated at 101. The projector 101 includes a light source 102, a condenser 103, a liquid crystal device 104, a further condenser 105, a ring aperture 106, and projection optics 107. Light 110 from the light source 102 is modulated by the liquid crystal device 104, and the modulated light 111 is discriminated by the aperture 106 to separate specular light, which is blocked, from scattered light which is projected by the projection optics 107 as a light output 112. The light output 112 may be directed to a screen or other device where it may be viewed or otherwise utilized.

The light source 102 may be an incandescent lamp, an arc lamp, or some other source of light. The light source 102 and condenser 103 cooperate to provide collimated light 110c, which is incident on the liquid crystal device 104. The light source 102 and condenser 103 are one example of a light source or supply to provide the collimated light 110c; it will be appreciated that other means may be used to provide such collimated light, such as, for example, various types of light emitting devices, lamps, lenses, reflectors, baffle systems, remote sources of light lasers, and so forth. In the exemplary embodiment illustrated in FIG. 12, the condenser 103 is a lens and the light source is positioned relative to the lens such that the light output therefore is collimated or is substantially collimated.

The liquid crystal device 104 transmits the light which is incident thereon or scatters the light that is incident thereon. The transmitted light (specular light) is represented at 111t and the scattered light is represented at 111s. Depending on the operative condition of the liquid crystal device 104 or respective portions thereof incident light 110c will be transmitted 111t or scattered 111s. The light 111 from the liquid crystal device 104 is directed via the further condenser 105 to the aperture 106.

In the illustrated embodiment of projector 101 the aperture 106 is a ring aperture in which a generally annular opening 113 is formed in a mask 114. At the center of the annular opening 113 is a stop 115. The further condenser 105 and the aperture 106 cooperate such that the further condenser 105 focuses the transmitted light 111t at or near the stop 115, whereby the stop is able to block further transmitting of such light beyond the stop and aperture 106. The further condenser 105 and aperture 106 also are cooperative such that the scattered light 111s is directed by the further condenser through the opening 113 in the aperture 106 as light 117. The light 117 is projected by the projection lens 107 as the light output 112 of the projector 101. The light output 112 may be directed to a screen on which an image for covering is formed or may be otherwise utilized.

The liquid crystal device 104 is described hereinafter as an NCAP liquid crystal device, several examples of which are disclosed in the above U.S. patents, and as is known, such devices sometimes are referred to as composites, PDLC, LCPC, and possibly by other names or acronyms. However, other liquid crystal devices of the type which has operative modes to scatter light and to transit light may be used. For brevity in this description, though, reference to NCAP device collectively refers to all aforementioned liquid crystal devices. Another type of liquid crystal device useful in the projectors described herein provides variable optical polarization features as are described in U.S. Pat. Nos. 5,113,270, 5,479,277 and 5,523,863; these and all other patents are applications referred to herein are incorporated entirely by references.

As is described in further detail below, relative control of the angle over which light is scattered by the liquid crystal device may be achieved by using relatively low birefringence liquid crystal material in the NCAP device, controlling or selecting the size of the volumes of liquid crystal and/or controlling or selecting the thickness of the liquid crystal device. In an exemplary NCAP device volumes of liquid crystal material and another medium cooperate to cause light scattering due to index of refraction differences. In such an exemplary device the liquid crystal material is birefringent; the extraordinary index of refraction is different from the index of refraction of the medium, and the alignment, organization, etc. of the liquid crystal is influenced by the medium, whereby incident light is scattered. However, in such exemplary device the ordinary index of refraction is matched or substantially matched to the index of refraction so that when alignment of the liquid crystal is appropriate, e.g., in response to a prescribed input, scattering decreases. Scattering may occur due to the mismatch between the index of refraction of the medium and the extraordinary index of refraction of the liquid crystal material; and a decrease in scattering may occur due to the closer matching of the ordinary index of refraction to the index of refraction of the medium compared to the larger difference between the extraordinary index and the index of the medium.

In an embodiment of the invention the birefringence of the liquid crystal is about 0.12 or less. More preferably it is about 0.08 or less. Even more preferably it is between about 0.04 and about 0.08.

In an embodiment of the invention the liquid crystal volumes are about 5 microns or less in size or diameter. The size of the volumes. may be about 4 microns or less. The size also may be about 3 microns or less. These sizes are, of course, approximate. The volumes may be spherical or another shape. The volumes may or may not be interconnected; or some may and some may not be interconnected. The volumes may be discrete or not. The volumes may be volumetric areas or space in a matrix of the medium. The size of the volumes may affect the density of the scattering sites for a given thickness of liquid crystal device; the smaller the scattering sites or scattering centers, the more scattering that is obtained.

In an embodiment the liquid crystal material may be nematic, smectic, cholesteric, operationally nematic, operationally smectic, or operationally cholesteric, smectic A or other material operative in the context of the invention. In an embodiment the liquid crystal material is nematic liquid crystal which has positive dielectric anisotropy. Other liquid crystal materials also may be used.

The medium may be any of many different materials, as is known. Examples include polyvinyl alcohol, polymer, resin, epoxy, urethane and others.

In the projector 101 illustrated in FIG. 12 light 10 from a small light source 102 is collimated by the condenser lens 103. When the NCAP liquid crystal device 104, which may be considered, for example, a light modulator or a display type of device, is in its clear state, the light remains collimated as it passes to the further condenser lens 105. This further condenser lens 105 then refocuses the light back to a small spot 120. The stop 115 of the ring aperture 6 is located at this focal point and blocks any light transmission of such specular light 111t. Any light 111s scattered by the NCAP device 104, is directed by the fur condenser lens 105 through the ring aperture 106 to the projection lens 107. The further condenser lens 105 and projection lens 107 combine to focus an image of the NCAP device 104 on a projection screen (not shown). The focal distance can be adjusted by changing the spacing between these two lenses.

It will be appreciated that although lenses are illustrated and described herein for various optical functions, other equivalent devices may be equivalently used; examples are one or more reflectors, combinations of lenses, of reflectors or of both lenses and reflectors, and so forth.

Another optical phenomenon that can degrade the performance of the dark state of the projector 101 is diffraction. When the NCAP device 104 is divided into pixels for display purposes, an isolated clear pixel can diffract a very small fraction of the light passing through it. The diffracted light will no longer be parallel to the original beam and the further condenser lens 105 will not focus it onto the stop 115. Instead it would pass through the ring aperture 106, and would be collected by the projection lens 107 for projection, thus possibly reducing contrast or otherwise degrading the projected image. This problem can be ameliorated by placing an appropriate phase plate 121 at the ring aperture 106, as is schematically shown as an embodiment possibility for the projector 101 of FIG. 12. This phase plate 21 acts as a spatial filter and can eliminate or reduce the effect of such diffraction.

Figure 13:
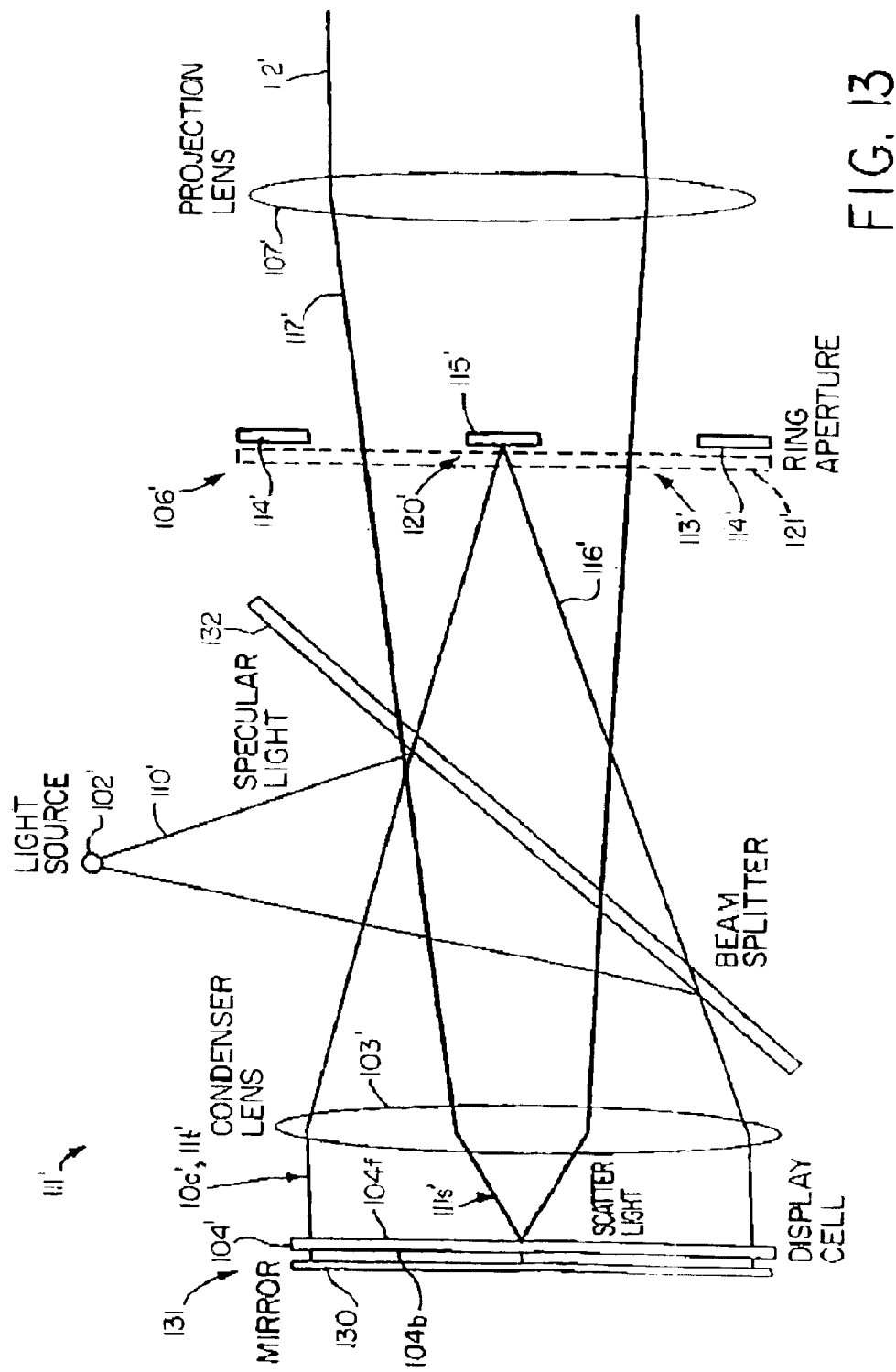
FIG. 13 is a schematic illustration of an alternate embodiment of liquid crystal projector in accordance with the invention.

An alternate embodiment of projector 101' is illustrated in FIG. 13. In FIG. 13 primed reference numerals designate parts that are similar or the same in form and function as corresponding parts designated by unprimed reference numerals in FIG. 12. The projector 101' is used in a reflective mode, as illustrated in FIG. 13.

As is seen in FIG. 13, a plain mirror 130 is placed on the back side 104b of the NCAP device 104', which is now illuminated from the front side 104f. Only a single condenser lens 103' is required in the projector 101'. The single condenser lens 103' performs two separate functions. It collimates the light from the source 103' and also refocuses the collimated light reflected from the display device 131, for example, including the NCAP device 104' and the mirror 130, onto the stop 115' of ring aperture 106'. A beam splitter 132 allows the source and reflected beams to overlap. An advantage of the reflection mode is that it permits the thickness of the NCAP device 104', e.g., the one or more layer(s) of liquid crystal material or volumes of liquid crystal thereof, to be of a reduced thickness, e.g., compared to the thickness of the NCAP device 104 of the projector 101 of the FIG. 12 embodiment, and such reduction in thickness can result in a reduction in the required drive voltage for the NCAP device. This is because the light now makes two passes through the liquid crystal device 104'. The main disadvantage is that the distance between the NCAP cell and the projection lens 107 is increased, raising the light collection f#.

One significant limitation of this system, is that any light that is scattered into too large of an angle will not hit the entrance pupil of the projection lens, and is lost. Therefore it is desirable to have an NCAP device with a narrow scatter distribution. This will allow a projection lens of reasonable f# to capture more of the scattered light energy.

The pattern of light scatter in NCAP devices is controlled by several factors and differs in several ways from common passive scattering materials. The primary factors are voltage, thickness, particle size, and liquid crystal birefringence. Light photons passing through an NCAP cell (sometimes the NCAP device may be referred to herein as a cell or even as a layer) are segregated into three distinct populations. One segment of the photon population sees no scattering at all. It passes through the cell in a completely specular fashion (transmitted light or specular light). The photons in the second group participate in precisely one scattering event each. The photons in the third group engage in multiple scattering events. The relative sizes of these groups are determined principally by the thickness of the NCAP layer and the voltage across it. The angular distribution of the photons in group two is controlled by the liquid crystal particle size and the birefringence.

Figure 14:
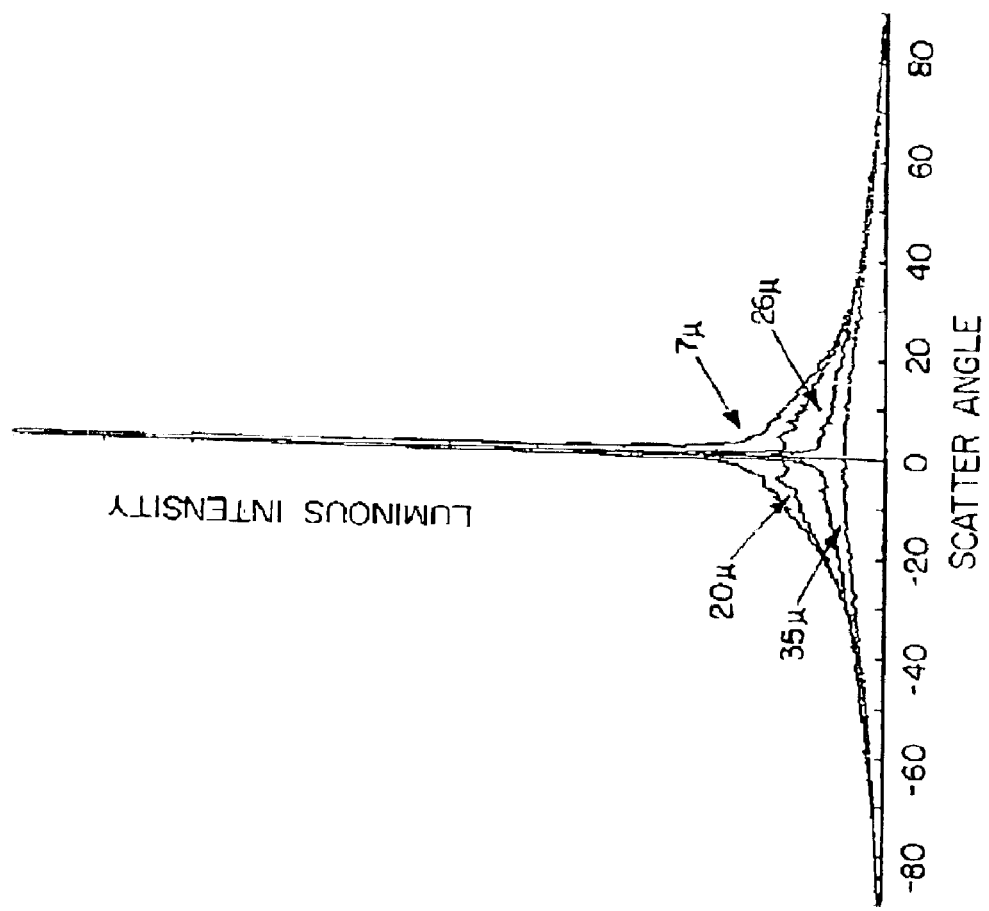
FIGS. 14 and 15 are graphical representations of the light scatter distribution for several film thicknesses of NCAP device, the data in the graphs of both figures being the same, but the scale of FIG. 15 being expanded relative to the scale of FIG. 14.
Figure 15:
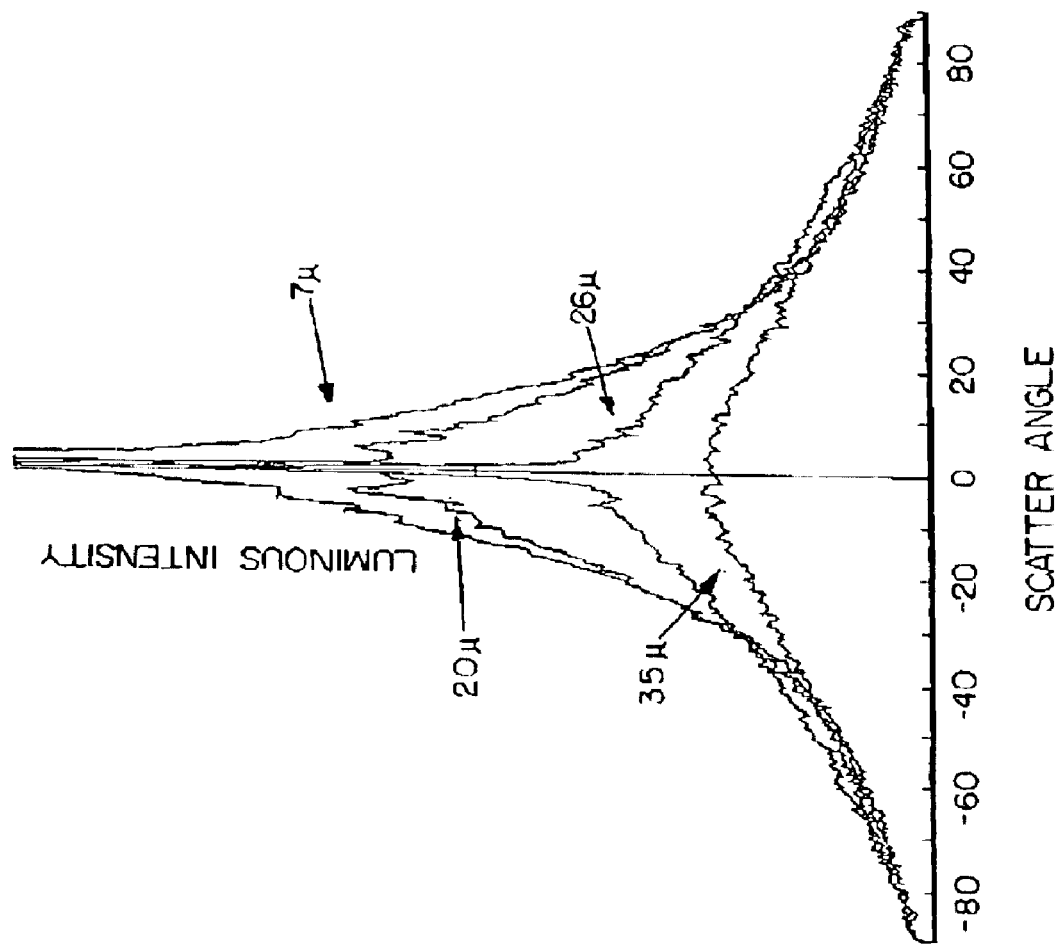

For a very thin NCAP cell with no voltage applied, the photon population distribution is dominated by the unscattered fraction. Most of the remaining photons are involved in single scatter events. Very few photons are multiple scattered. As the thickness of the NCAP layer is increased photons are shifted from the unscattered group to the single scatter group. For a substantial portion of the thickness range, there is little transfer to the multiple scatter group. As a result the shape of the angular distribution of photons changes little. The relative amplitudes of the scattered and unscattered populations change, but the width of the distribution for each does not. As the cell thickness increases beyond this range, a significant amount of multiple scatter begins to occur. Since the multiple scatter distribution is much wider than the single scatter distribution, the composite distribution widens as the NCAP thickness grows. The single and multiple scatter distributions overlap and are not easily distinguishable. In the limit, all photons are multiple scattered, leading to a Lambertian distribution. An example of this trend is illustrated in FIGS. 14 and 15 using a series of NCAP cells of varying thickness, made using the same liquid crystal (E49). These graphs are plots of luminous intensity vs. scatter angle (as measured from the normal). A Lambertian diffuser would produce a cosine curve on the type of plot. FIGS. 14 and 15 present the same data but on different scales. The feature to be noted in FIG. 14 is the size if the spike centered at 0°. This represents the amount of unscattered light. The increased scale of FIG. 15 makes it easier to see the shape of the scattered portion of the distribution. When the curves for the 7 and 20 micron thick NCAP film samples are compared, a substantial difference in the amplitudes of the unscattered specular peaks can be seen. Yet, the shape of the angular scatter is almost the same, with only a change of amplitude, corresponding to the transfer from the specular population. This indicates that most of the scattered photons have undergone only one scatter event. The curve for the 26 micron thick sample begins to show a change of character. The specular peak is almost gone and the width of the scatter has widened, indicating a significant increase in multiple scattering. The 35 micron sample shows a complete absence of specular photons and the width of the scatter distribution indicates that multiple scatter is now dominant.

Figure 16:
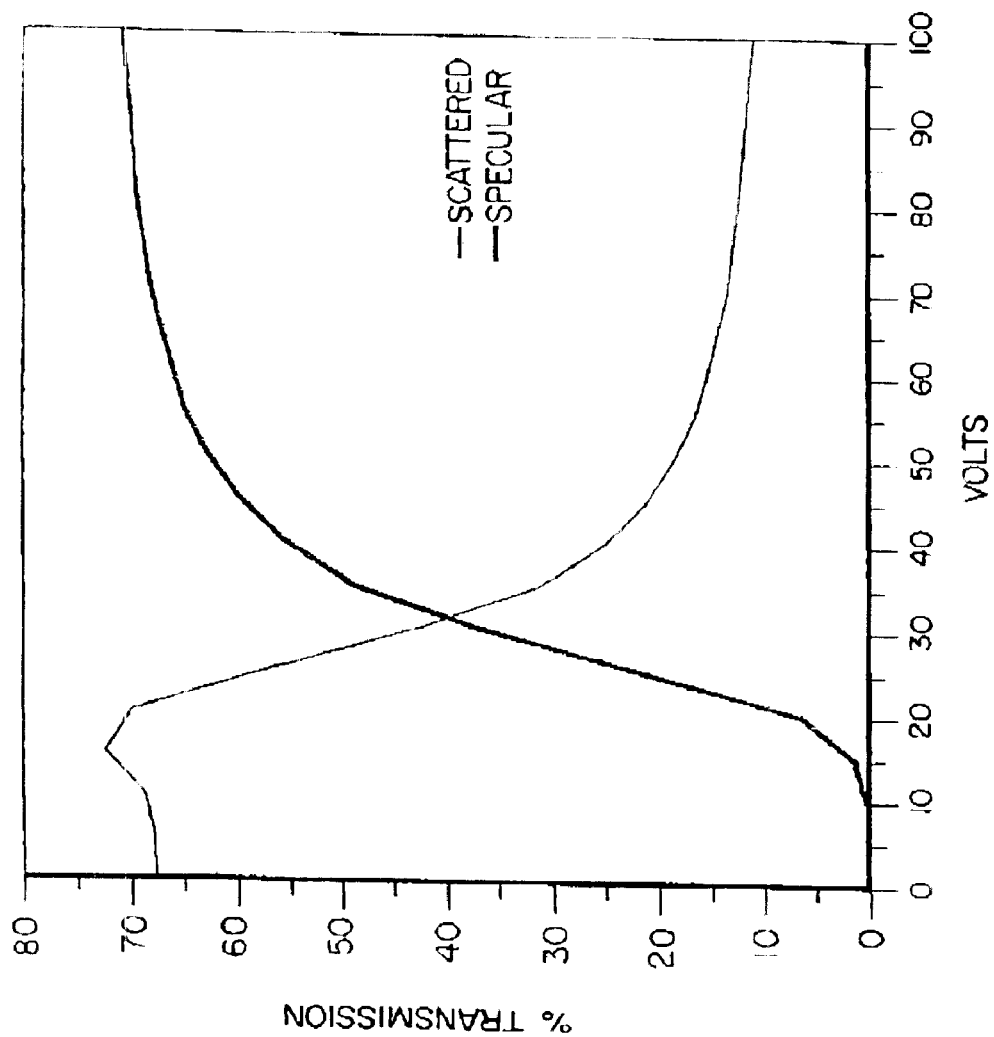
FIG. 16 is a graph illustrating the transfer of light from the scatter to the specular for a 20 micron thick NCAP device.

The voltage response mimics the thickness response. The voltage is the voltage of electric field applied across the liquid crystal example as the prescribed input. There is a small voltage threshold, below which no change in the scatter distribution occurs. As voltage is increase beyond the threshold, photons are transferred from the multiple scatter group to the single scatter group and from the single scatter group to the specular group. The transfer of light from the scatter to the specular is graphed for a 20 micron cell in FIG. 16. As can be seen, there is a knee at about 3 times the threshold voltage. Above that level the transfer process goes asymptotically to a limit. As with thickness, changes in the applied voltage do not change the distribution width of any of the three photon populations. Only the relative amplitudes are changed. The dependence of the width of the scatter distribution on particle size and liquid crystal birefringence can be understood by thinking of each scatter event as refraction by a spherical lens. The focal length of a spherical lens is proportional to its radius and inversely proportional to its index of refraction. The angle through which the lens refracts any given ray of light increases with decreasing focal length and with increasing distance between the incident point and the center line of the lens. The liquid crystal material is birefringent. Its ordinary index of refraction is matched to the index of refraction of the binder, medium, or containment medium. The extraordinary index of refraction is somewhat higher. The "index of refraction" may be referred to as "index" below. When the NCAP film is in the low voltage, high scatter, state, the director of the liquid crystal droplet lies in or near the plain of the film. As a result, light rays entering the film at normal incidence will see the extraordinary index as the index of the particle. For rays off normal, the index will he slightly lower. While the liquid crystal particles in NCAP films are oblate spheroids, rather than true spheres, the general trend can be illustrated by looking at refraction by a sphere with index of refraction equal the liquid crystal extraordinary index imbedded in a media with an index equal to the ordinary index.

Figure 17:
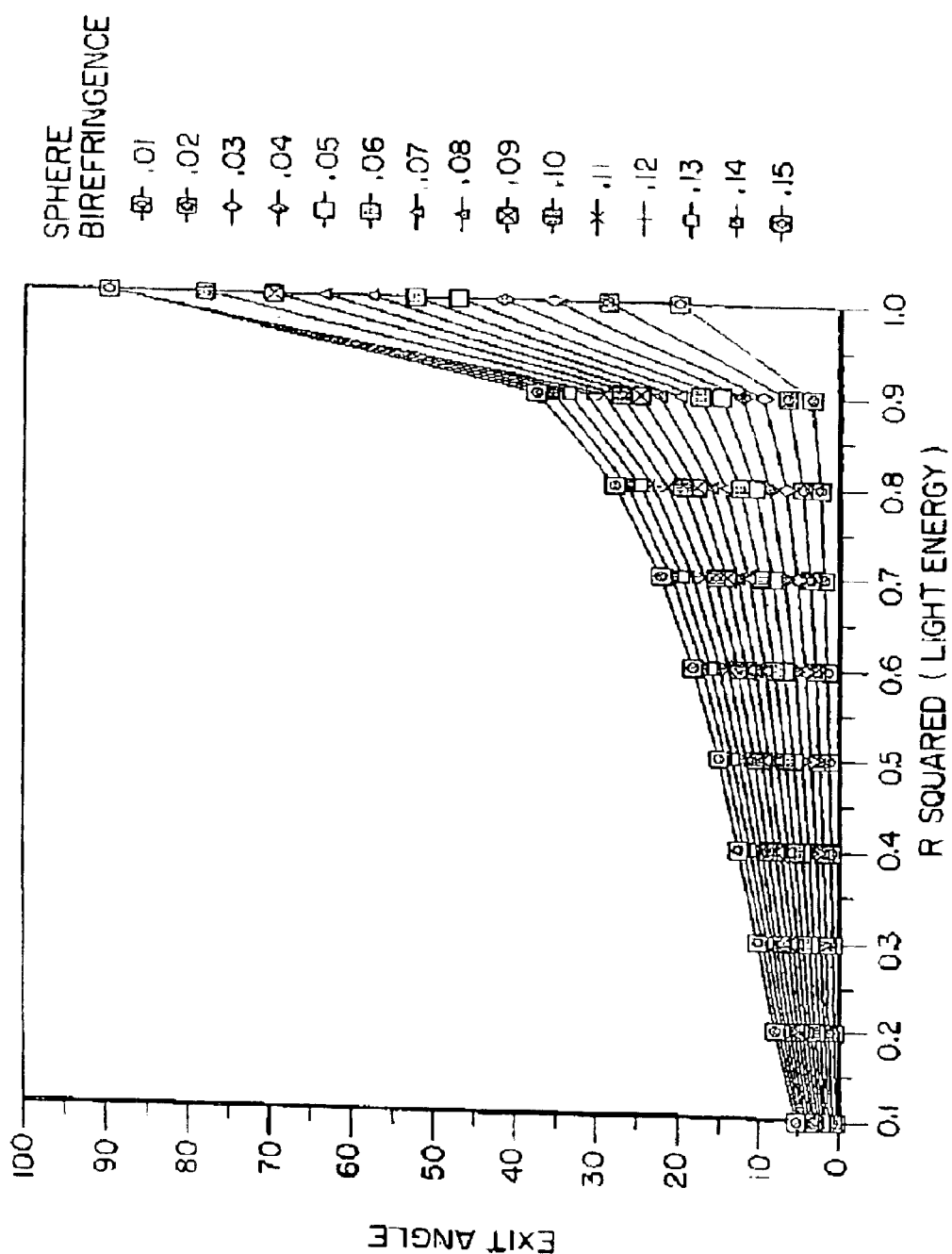
FIG. 17 is a graph showing the impact of birefringence on refraction angle for a spherical device, such as a liquid crystal material contained in a generally spherical containment medium, and in a sense is a plot of the refraction cone angle vs. the light energy contained within that cone for different liquid crystal birefringence.

FIG. 17 shows the impact birefringent on refraction angle. In this plot R is distance of the incident point on the sphere from the center line. The light energy refracted inside a given exit angle is proportional to the projected area of a circle of radius R on the input of the sphere. That area is in turn proportional to $R^2$. Effectively this is a plot of the refraction cone angle vs. the light energy contained within that cone for different liquid crystal birefringence. As can be seen, higher the birefringence, produces a wider the distribution of light energy.

Figure 18:
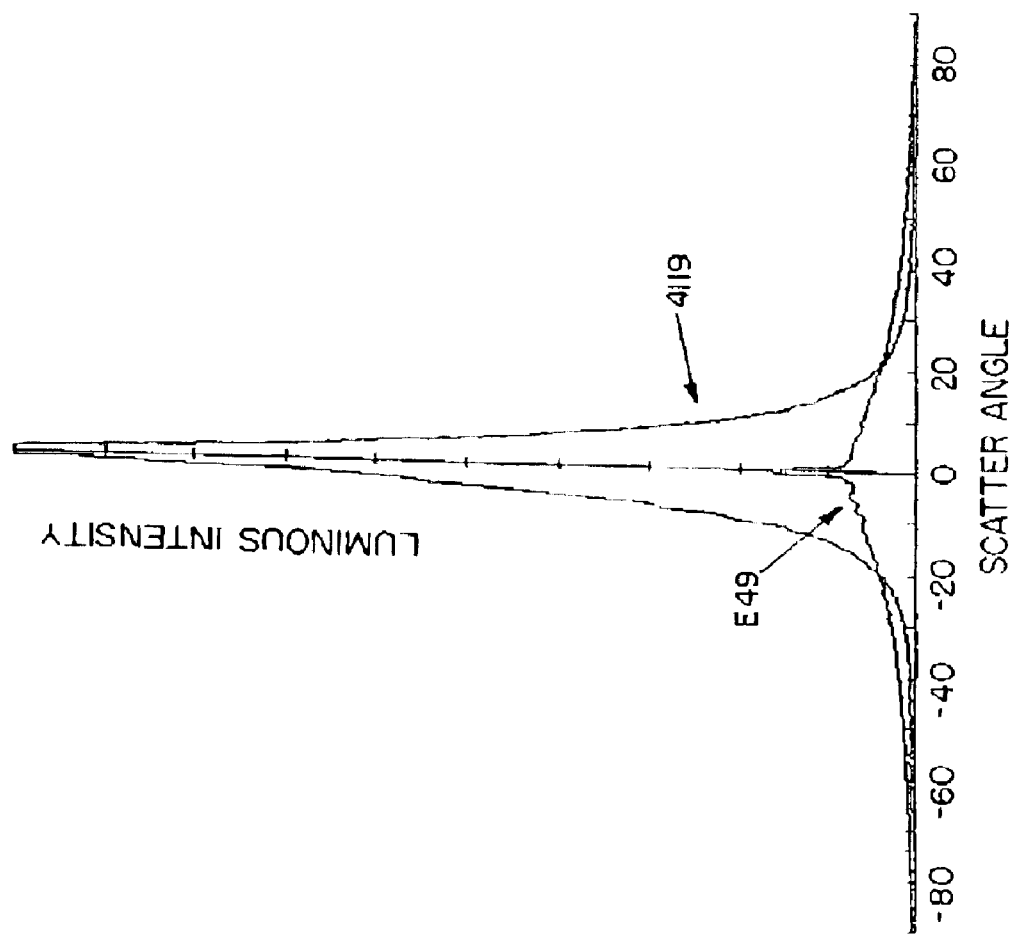
FIG. 18 is a graph illustrating the impact of liquid crystal birefringence on the width of NCAP scatter distributions for two different NCAP films, one with relatively high and the other with relatively low birefringence.
Figure 19:
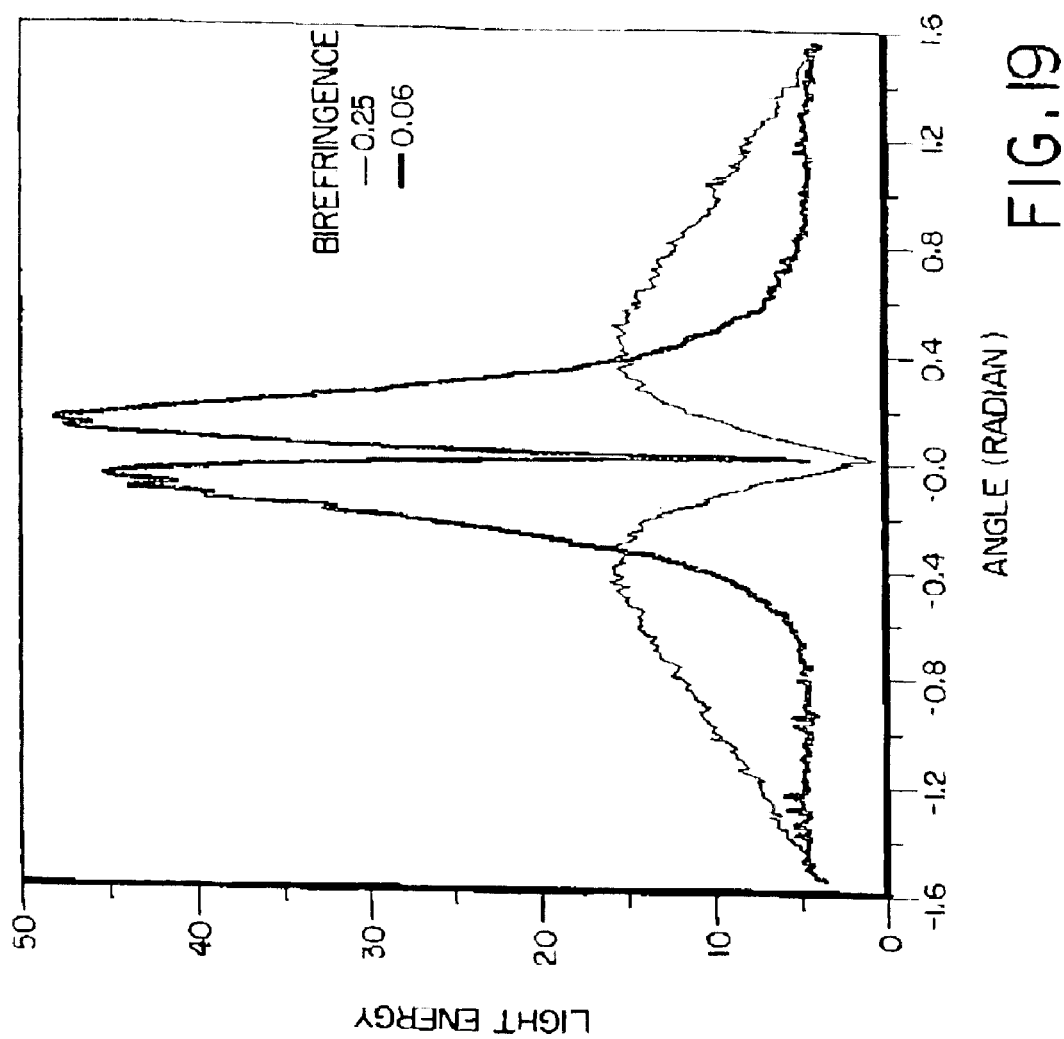
FIG. 19 is a graph illustrating scatter energy distribution for two different NCAP films, respectively, having relatively high birefringence and relatively low birefringence.

FIG. 18 illustrates the impact of liquid crystal birefringence on the width of NCAP scatter distributions. This shows the scatter for two NCAP films, one with high and the other with low birefringence. The birefringence of E49 and 4119 are 0.25 and 0.06 respectively. Each film is chosen with thickness such that the distribution is dominated by the single scatter mode, with a small amount of specular leak through. Clearly the lower birefringence material has a much narrower scatter distribution. To determine the correlation of scatter width on the efficiency of the projector, one may convert the intensity plot to an energy density plot. This is done by multiplying the intensity at a given angle by the solid angle of a differential annular ring at that angle. This transformation is performed in FIG. 19. The light collection efficiency for a projector lens of a given f# depends on the amount of energy that falls within its entrance pupil. Most of the energy from the low birefringence NCAP would be captured by an f 1.4 lens. For the high birefringence NCAP most of the energy would not. Notice that there is very little energy contributed by the very center of the distribution. This means the stop 115 in the center of the ring aperture will block very little of the scattered light.

An advantage of the low birefringence NCAP Schlieren projector of the type described, is that it can provide high contrast images with extremely thin NCAP layers. In turn this allows low voltage drive circuits to be used. Also, a high intensity light source can be used, because there is negligible absorption in NCAP material. The narrow scatter angle of the low birefringence NCAP leads to a high collection efficiency with a reasonable size projection lens. The bright source combined with the efficient collection yield a bright projected image.

An example of light source 102 may be, for example, a metal halide light source. To facilitate collimation of light directed to the liquid crystal device the light source 103 may be located at the focal point of the condenser 103 lens; the accuracy of such positioning, though, may vary with the extent of collimation desired. For example, if haze is not of concern and it is not necessary to have the incident light normal to the liquid crystal device, then other arrangements of the light source and condenser may be employed. Similarly, the function of the further condenser 105 is to direct light that was not scattered by the liquid crystal device 104 to the stop 115. The precise positioning of the further condenser 105 and the stop 115 may be varied, provided such function is obtained; however, in an embodiment of the invention, the further condenser receives the specular or transmitted light as collimated or substantially collimated, and the stop 115 is positioned at the focal point of the further condenser so that such focusing of such light thereat is obtained.

The projection optics 107 may be a single projection lens or a combination of lenses, reflectors or other elements that project the light output 112 for the desired purpose, such as to provide an image on a screen or some other purpose.

The distance between the NCAP device 4 and the condenser 103 of projector 101 is not critical. The distance between the NCAP device 104 and the condenser 103' of projector 101' preferably is such that the image of the NCAP device can be in effect focused at the screen onto which the output light 112 is directed.

The illustration in FIG. 15 indicates that there is bleed through in the center if a thin NCAP device is used until the thickness gets to be about 35 microns thick. However, for such a thick NCAP device, there is increased voltage required, which may increase cost of the projector; there also may be more than a nominal increased cost for the liquid crystal material itself.

Desirably the liquid crystal material used gives the optimum output and contrast with respect to an output, e.g., output optics, of a particular f number.

Moreover, although the aperture 106 may be a ring aperture having a generally annular opening 113 in a mask or plate 114 with a central stop 115, it may be possible to eliminate the plate 114 itself. In such case, the central stop 115 blocks specular light; and the collected scattered light for projection by the projection optics 107 may be determined by the size and/or f number of the projection optics itself. Therefore, the aperture may be defined by the stop and a light transmitting area adjacent the stop, and the radial extent or remote limit or distance of the light transmitting area of the aperture is limited by the f number of the projection optics. Also, the aperture may be absent an external defining element, and the entrance pupil of the projection optics limits the amount of light that is collected from the aperture.

The relatively thin NCAP device useful in the invention permits the use of a relatively low drive voltage. Due to the cooperation of the liquid crystal device and the ring aperture, the output light 112 provides a bright image; there is relatively little bleed through that would degrade contrast, e.g., compared to the leakage of prior center aperture projectors mentioned above. Also, since the liquid crystal device can be rather thin, the amount of energy dissipated therein is rather small, and, accordingly, rather bright light sources can be used without causing a burn out of the liquid crystal device due to excess heat or energy dissipation in the liquid crystal device; this in combination with the ring aperture arrangement allows a substantial amount of light to be put through the projector to provide a bright output.

The central stop 115 may be supported in the annular opening 113 by various means. One example is a spider type of support. Another example is to use a glass or other transparent material in the opening area and of the plate 114 and to place an optically non-transmissive material at the center area of such material to serve as the stop 115. Also, if desired, a light pipe, reflector, or some other device may be placed in the area of the stop 115 to conduct light directed thereto away from the light path leading to the projection optics.

Further, although in the projectors hereof a separate projection optics 107 is disclosed, it will be appreciated that the lens of the further condenser 105 may be coordinated with the other components of the projector to provide the projection function without the need for separate projection optics or with the modification of the projection optics.

The invention also embodies drive circuitry for driving the liquid crystal device 4. Such circuitry may comprise one or more conductors, integrated circuit devices, thin film transistors or other devices, other solid state devices, other electrical devices or components, video circuitry, television circuitry, computer, electrodes, and so forth. Such circuitry may be used to drive the liquid crystal device and to generate the signals to drive the device, e.g., to develop an image for projection.

Also, the liquid crystal device may be a plurality of such devices operated simultaneously or sequentially or both to provide monochrome, color or multicolor output light and images.

I claim:

1. A liquid crystal display system, comprising
   a substrate having plural electrodes in spaced apart relation,
   plural volumes of liquid crystal in a medium, said volumes of liquid crystal arranged in overlying relation to respective electrodes, said volumes of liquid crystal being selectively operable to scatter light or to transmit light without substantial scattering,
   a mask between respective groups of volumes of liquid crystal, said mask being in overlying relation to said substrate and between respective electrodes such that the mask covers said substrate at least substantially up to a lateral boundary of each electrode.

2. The system of claim 1, said mask being substantially transparent.

3. The system of claim 1, said mask being substantially non-scattering, said volumes being operative to scatter light in the absence of a prescribed input, and said volumes being operative to reduce scattering in response to a prescribed input.

4. The system of claim 1, wherein said liquid crystal comprises liquid crystal material having a birefringence of about 0.12 or less.

5. The system of claim 1, wherein said liquid crystal display includes a medium having plural volumes containing the liquid crystal material, an angle of the light scattering being a function of the size of the volumes, and wherein the size of the volumes is about 5 microns or less.

6. The system of claim 1, wherein said liquid crystal comprises liquid crystal material having a birefringence between about 0.04 to about 0.08.

7. The system of claim 1, wherein the volumes of liquid crystal comprise liquid crystal material of relatively low birefringence in a medium that has surfaces to cause scattering of light in the absence of a prescribed input and reduces scattering in response to the prescribed input, wherein the surfaces interact with the liquid crystal material to cause scattering of light, and wherein the surfaces interact with the liquid crystal material to cause scattering of light due to a difference between the extraordinary index of refraction of the liquid crystal material and the index of refraction of the material of the surfaces.

8. The system of claim 1, wherein the ordinary index of refraction of the liquid crystal is substantially matched to the index of refraction of the medium, and wherein the liquid crystal has positive dielectric anisotropy.

9. The system of claim 1, wherein the liquid crystal is operationally nematic, operationally smectic or cholesteric.

10. The system of claim 1, wherein the mask is a separator comprised of the medium.

11. The system of claim 1, wherein the mask is laterally in direct contact with the electrodes.

12. The system of claim 1, wherein electrical components for driving the electrodes are at least partly vertically aligned with a space between adjacent picture elements, and the mask overlying the portions of the electrical components that are vertically aligned in the space to optically mask the portions of the electrical components that are vertically aligned with the space.

13. A liquid crystal display for a Schlieren projection display system, comprising:
   plural liquid crystal picture elements selectively operable to affect light by scattering or absorbing light or by reducing such scattering or absorption of light;
   a separator integral with and between respective picture elements, said separator being substantially non-selectively operable to affect light, and defines an inherent mask of lateral spacers between respective picture elements thereby forming a grid of spacers and picture elements; and
   plural electrodes in spaced relation for selectively applying electrical input to respective picture elements;
   wherein:
      said liquid crystal picture elements comprising liquid crystal and a medium that are cooperative for selective operation to scatter light for projection or to reduce such scattering or absorption, and
      said inherent mask transmits light between respective picture elements without substantial scattering.

14. The liquid crystal display for a Schlieren projection display system of claim 13, wherein the integral separator is comprised of the medium of the liquid picture elements.

15. The liquid crystal display for a Schlieren projection display system of claim 13, wherein the integral separator is laterally in direct contact with the electrodes.

16. The liquid crystal display for a Schlieren projection display system of claim 13, wherein the spacers of the separator cover a substrate of the liquid crystal display at least substantially up to a lateral boundary of each electrode.

17. The liquid crystal display for a Schlieren projection display system of claim 13, wherein the inherent mask optically masks the space between respective electrodes by transmitting light without substantial scattering.

18. The liquid crystal display for a Schlieren projection display system of claim 13, wherein electrical components for driving the electrodes are at least partly vertically aligned with the space between adjacent picture elements, and said separator overlying the portions of the electrical components that are vertically aligned in the space to optically mask the portions of the electrical components that are vertically aligned with the space.

19. A liquid crystal display, comprising:
   plural liquid crystal picture elements selectively operable to affect light by scattering or absorbing light or by reducing such scattering or absorption of lights;
   a separator integral with and between respective picture elements, said separator being substantially non-selectively operable to affect light and said separator comprising lateral spacers between respective picture elements thereby forming a grid of spacers and picture elements; and plural electrodes in spaced relation for selectively applying electrical input to respective picture elements; wherein said spacers spacer means being located in relation to the space between respective electrodes; and electrical components for driving the electrodes are at least partly vertically aligned with the space between adjacent picture elements, and said separator overlying the portions of the electrical components that are vertically aligned in the space to optically mask the portions of the electrical components that are vertically aligned with the space.

20. A liquid crystal display, comprising:

plural liquid crystal picture elements selectively operable to affect light by scattering or absorbing light or by reducing such scattering or absorption of light;

a separator integral with and between respective picture elements, said separator being substantially non-selectively operable to affect light, and said separator comprising lateral spacers between respective picture elements thereby forming a grid of spacers and picture elements; and plural electrodes in spaced relation for selectively applying electrical input to respective picture elements; wherein said spacers spacer means being located in relation the space between respective electrodes; and the picture elements comprise liquid crystal and a medium, and the integral separator is comprised of the medium of the liquid picture elements.

21. The display of claim 20, said separator defining an inherent mask between respective picture elements.

22. The liquid crystal display of claim 20, wherein the integral separator is laterally in direct contact with the electrodes.

23. A liquid crystal display, comprising:

plural liquid crystal picture elements selectively operable to affect light by scattering or absorbing light or by reducing such scattering or absorption of light;

a separator integral with and between respective picture elements, said separator being substantially non-selectively operable to affect light, and said separator comprising lateral spacers between respective picture elements thereby forming a grid of spacers and picture elements; and plural electrodes in spaced relation for selectively applying electrical input to respective picture elements; wherein said spacers spacer means being located in relation to the space between respective electrodes; and the spacers of the separator cover a substrate of the liquid crystal display at least substantially up to a lateral boundary of each electrode.

24. A liquid crystal display, comprising:

plural liquid crystal picture elements selectively operable to affect light by scattering or absorbing light or by reducing such scattering or absorption of lights;

a separator integral with and between respective picture elements, said separator being substantially non-selectively operable to affect light, and said separator comprising lateral spacers between respective picture elements thereby forming a grid of spacers and picture elements; and plural electrodes in spaced relation for selectively applying electrical input to respective picture elements; wherein said spacers spacer means being located in relation to the space between respective electrodes; and wherein the separator optically masks the space between respective electrodes by transmitting light without substantial scattering.

25. A liquid crystal display, comprising:

a plurality of picture elements comprised of liquid crystal in a medium, each picture element separated from adjacent picture elements by portions of the medium that are substantially free of liquid crystal; and a plurality of electrodes disposed with respect to the picture elements to selectively apply electrical input to the picture elements;

wherein electrical components for driving the electrodes are at least partly vertically aligned with a space between adjacent picture elements, and the portions of the medium that are substantially free of liquid crystal overlying the portions of the electrical components that are vertically aligned in the space to optically mask the portions of the electrical components that are vertically aligned with the space.

26. A liquid crystal display, comprising:

a plurality of picture elements comprised of liquid crystal in a medium, each picture element separated from adjacent picture elements by portions of the medium that are substantially free of liquid crystal; and a plurality of electrodes disposed with respect to the picture elements to selectively apply electrical input to the picture elements;

wherein the picture elements are operative to scatter light or transmit light by reducing scattering based on the electrical input, and the portions of the medium that are substantially free of liquid crystal are operative only to transmit light without substantial scattering.

* * * * *

UNITED STATES PATENT AND TRADEMARK OFFICE
CERTIFICATE OF CORRECTION

PATENT NO. : 6,917,355 B1
APPLICATION NO. : 09/367423
DATED : July 12, 2005
INVENTOR(S) : Fergason Page 1 of 1

It is certified that error appears in the above-identified patent and that said Letters Patent is hereby corrected as shown below:

Column 15, Line 54, replace "transit" with --transmit--.
Column 16, Line 50, replace "light 10" with --light 110--.
Column 19, Line 13, replace "he" with --be--.
Claim 20, Line 14, replace "relation the" with --relation to the--.

Signed and Sealed this

Tenth Day of October, 2006

JON W. DUDAS
*Director of the United States Patent and Trademark Office*